United States Patent
Hatanaka et al.

(10) Patent No.: US 10,598,836 B2
(45) Date of Patent: Mar. 24, 2020

(54) LAMINATED BODY, CIRCULARLY POLARIZING PLATE INCLUDING LAMINATED BODY, DISPLAY DEVICE INCLUDING LAMINATED BODY

(71) Applicant: SUMITOMO CHEMICAL COMPANY, LIMITED, Tokyo (JP)

(72) Inventors: Nobuyuki Hatanaka, Osaka (JP); Tatsuaki Kasai, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 242 days.

(21) Appl. No.: 15/216,462

(22) Filed: Jul. 21, 2016

(65) Prior Publication Data

US 2017/0023717 A1 Jan. 26, 2017

(30) Foreign Application Priority Data

Jul. 24, 2015 (JP) .................................. 2015-147141

(51) Int. Cl.
*G02B 5/30* (2006.01)
*G02F 1/1335* (2006.01)

(52) U.S. Cl.
CPC ......... *G02B 5/3025* (2013.01); *G02B 5/3016* (2013.01); *G02F 2001/133541* (2013.01); *Y10T 428/10* (2015.01); *Y10T 428/1036* (2015.01)

(58) Field of Classification Search
CPC ...... G02B 5/3016; G02B 5/3083; G02B 5/32; C09K 19/3809; C09K 19/3833; C09K 19/3838; C09K 19/542; C09K 2019/2078; C09K 2019/0448; G02F 1/13363; G02F 1/133632; G02F 1/133634; Y10T 428/10; Y10T 428/1036; Y10T 428/1045; Y10T 428/105
USPC ........ 428/1.1, 1.3, 1.32, 1.33; 349/117, 118, 349/121, 194; 252/299.64–299.68
See application file for complete search history.

(56) References Cited

U.S. PATENT DOCUMENTS

| | | | |
|---|---|---|---|
| 2012/0056129 A1* | 3/2012 | Hasebe | C08F 2/48 252/299.5 |
| 2015/0041051 A1 | 2/2015 | Kobayashi | |
| 2015/0043072 A1 | 2/2015 | Sase et al. | |
| 2015/0062505 A1 | 3/2015 | Hatanaka et al. | |
| 2015/0218453 A1 | 8/2015 | Kobayashi et al. | |

FOREIGN PATENT DOCUMENTS

| | | |
|---|---|---|
| CN | 102863967 A | 1/2013 |
| CN | 104339796 A | 2/2015 |
| JP | 2007-334206 A | 12/2007 |
| JP | 2010-262098 A | 11/2010 |
| JP | 2011-2556 A | 1/2011 |
| JP | 2011-79984 A | 4/2011 |
| JP | 2011207765 A * | 10/2011 |
| JP | 2012-21068 A | 2/2012 |
| JP | 2013033248 A * | 2/2013 |
| JP | 2014-222282 A | 11/2014 |
| JP | 2014-222283 A | 11/2014 |
| JP | 2015-7700 A | 1/2015 |
| JP | 2015-57647 A | 3/2015 |
| JP | 2015-69157 A | 4/2015 |
| JP | 2015-143786 A | 8/2015 |
| JP | 2015-163934 A | 9/2015 |

OTHER PUBLICATIONS

U.S. Office Action for U.S. Appl. No. 15/216,550, dated Jul. 31, 2018.
Japanese Office Action dated Nov. 27, 2018 for Application No. 2016-145787, along with an English translation.
U.S. Office Action dated Nov. 30, 2018 for U.S. Appl. No. 15/216,550.
Japanese Office Action for Japanese Application No. 2016-145787, dated Apr. 2, 2019, with partial English translation.
U.S. Office Action for U.S. Appl. No. 15/216,550, dated Mar. 13, 2019.
U.S. Office Action for U.S. Appl. No. 15/216,550, dated Aug. 14, 2019.
Chinese Office Action and Search Report for Chinese Application No. 201610586671.X, dated Jul. 10, 2019, with English translation.
Chinese Office Action and Search Report for Chinese Patent Application No. 201610580113.2, dated Sep. 9, 2019, with a partial English translation.
U.S. Office Action for U.S. Appl. No. 15/216,550, dated Dec. 2, 2019.

* cited by examiner

*Primary Examiner* — Ruiyun Zhang
(74) *Attorney, Agent, or Firm* — Birch, Stewart, Kolasch & Birch, LLP

(57) ABSTRACT

The laminated body of the present invention includes an optically anisotropic layer, an alignment film, and an adhesive agent layer which are laminated in this order. The optically anisotropic layer has maximum absorptions at a wavelength in a range of not less than 300 nm and not more than 380 nm and satisfies Formula (Y) below. "$50<(1-P'/P0)\times100<85$ ... (Y)" wherein: P' represents a P value in a surface of the optically anisotropic layer on which surface the alignment film is laminated and which surface is perpendicular to a thickness direction; and P0 represents the P value of the polymerizable liquid crystal compound.

12 Claims, No Drawings

LAMINATED BODY, CIRCULARLY POLARIZING PLATE INCLUDING LAMINATED BODY, DISPLAY DEVICE INCLUDING LAMINATED BODY

This Nonprovisional application claims priority under 35 U.S.C. § 119 on Patent Application No. 2015-147141 filed in Japan on Jul. 24, 2015, the entire contents of which are hereby incorporated by reference.

TECHNICAL FIELD

The present invention relates to a laminated body, a circularly polarizing plate including the laminated body, and a display device including the laminated body.

BACKGROUND ART

A display device (FPD) such as an organic EL display device includes a constituent member such as an organic EL element, and a display device such as a liquid crystal display device includes a constituent member such as a liquid crystal cell. An organic EL compound and a liquid crystal compound which are used in the constituent members are organic matters, and therefore have a problem of deterioration by an ultraviolet ray (UV). Under the circumstances, measures such as adding a UV absorbent to (i) a protective film of a polarizing plate or (ii) a phase difference plate which are used in the display devices. Meanwhile, the display devices are demanded to be thinner and lighter in weight, and accordingly a polarizing plate having no protective film is demanded.

Patent Literature 1 discloses a phase difference film (optically anisotropic layer) made of a polymerizable liquid crystal compound having a UV absorption property.

CITATION LIST

Patent Literature

Patent Literature 1

US Patent Application Publication No. 2015/0062505, Specification (Publication date: Mar. 5, 2015)

SUMMARY OF INVENTION

Technical Problem

However, the optically anisotropic layer has a problem that the polymerizable liquid crystal compound in a deep part of the optically anisotropic layer is not sufficiently cured (polymerized) by an ultraviolet ray due to the UV absorption property of the optically anisotropic layer. This leads to a problem as follows: that is, in a case where an adhesive agent layer is laminated on a surface of an obtained optically anisotropic layer and then the optically anisotropic layer is exposed to a high-temperature environment, a part of a polymerizable liquid crystal compound which has not been reacted is melted and diffused in the adhesive agent layer, and the polymerizable liquid crystal compound becomes isotropic. From this, an optical characteristic of the optically anisotropic layer is decreased.

Solution to Problem

In order to solve the above problem, the present invention provides the following [1] through [12]:

[1] A laminated body including an optically anisotropic layer, an alignment film, and an adhesive agent layer which are laminated in this order, the optically anisotropic layer being formed by polymerizing a polymerizable liquid crystal compound and having a maximum absorption at a wavelength in a range of not less than 300 nm and not more than 380 nm, the optically anisotropic layer satisfying the following Formula (Y):

$$50<(1-P'/P0)\times 100<85 \quad (Y)$$

wherein: P' represents a P value in a surface of the optically anisotropic layer on which surface the alignment film is laminated and which surface is perpendicular to a thickness direction;

P0 represents the P value of the polymerizable liquid crystal compound; and the P value is represented by I(1)/I(2)

where I(1) represents a peak intensity derived from in-plane deformation vibration of an ethylenic unsaturated bond and obtained by infrared total reflection absorption spectrum measurement, and I(2) represents a peak intensity derived from stretching vibration of an unsaturated bond of an aromatic ring and obtained by the infrared total reflection absorption spectrum measurement.

[2] The laminated body described in [1], in which the optically anisotropic layer satisfies the following Formula (1):

$$100 \text{ nm}<Re(550)<160 \text{ nm} \quad (1)$$

wherein: Re(550) represents an in-plane phase difference value at a wavelength of 550 nm.

[3] The laminated body described in [1] or [2], in which the optically anisotropic layer satisfies the following Formula (1'):

$$100 \text{ nm}<Re(550)<150 \text{ nm} \quad (1')$$

wherein: Re(550) represents an in-plane phase difference value at a wavelength of 550 nm.

[4] The laminated body described in any one of [1] through [3], in which the optically anisotropic layer satisfies Formula (3) and Formula (4):

$$Re(450)/Re(550) \leq 1.0 \quad (3)$$

$$1.00 \leq Re(650)/Re(550) \quad (4)$$

wherein: Re(450) represents an in-plane phase difference value with respect to light having a wavelength of 450 nm; Re(550) represents an in-plane phase difference value with respect to light having a wavelength of 550 nm; and Re(650) represents an in-plane phase difference value with respect to light having a wavelength of 650 nm.

[5] The laminated body described in any one of [1] through [4], in which the polymerizable liquid crystal compound has a maximum absorption at a wavelength $\lambda_{max}(LC)$ that satisfies the following Formula (2):

$$300 \text{ nm} \leq \lambda_{max}(LC) \leq 380 \text{ nm} \quad (2)$$

[6] The laminated body described in any one of [1] through [4], in which: the optically anisotropic layer contains at least one photopolymerization initiator; and the at least one photopolymerization initiator is an oxime photopolymerization initiator.

[7] The laminated body described in [6], in which: the at least one photopolymerization initiator has maximum absorptions at a wavelength of less than 350 nm and not less than 350 nm.

[8] The laminated body described in any one of [1] through [7], in which: the optically anisotropic layer contains at least two photopolymerization initiators: and at least one of the at least two photopolymerization initiators has a maximum absorption at a wavelength of less than 350 nm and at least another one of the at least two photopolymerization initiators has a maximum absorption at a wavelength of not less than 350 nm.

[9] The laminated body described in any one of [1] through [8], in which: the alignment film is a photoalignment film which is made of a monomer or a polymer that expresses alignment regulating force by a photodimerization.

[10] The laminated body described in any one of [1] through [9], in which: the adhesive agent layer contains a polymer which includes a structural unit derived from an acrylic acid compound or a methacrylic acid compound, and the optically anisotropic layer contains a polymer obtained from a polymerizable liquid crystal compound having an acryloyl group or a methacryloyl group.

[11] A circularly polarizing plate including the laminated body described in any one of [1] through [10].

[12] An electroluminescent (EL) display device including the laminated body described in any one of [1] through [10].

[13] A touch panel display device including the laminated body described in any one of [1] through [10].

Advantageous Effects of Invention

The laminated body of the present invention brings about an effect of hardly causing a decrease in optical characteristic in a case where the laminated body is exposed to a high-temperature environment.

DESCRIPTION OF EMBODIMENTS

An embodiment of the present invention is specifically described below. Note that "A to B" herein refers to "not less than A and not more than B".

Embodiment 1: Laminated Body

A laminated body of the present invention has a configuration in which an alignment film is provided between an optically anisotropic layer and an adhesive agent. The laminated body of the present invention which has the configuration can inhibit a part of a polymerizable liquid crystal compound, which has not been reacted, from being melted and diffused in the adhesive agent in a case where the laminated body is exposed to a high-temperature environment. Thus, the laminated body of the present invention can inhibit a decrease in optical characteristic of the optically anisotropic layer in the case where the laminated body is exposed to a high-temperature environment.

As shown above, the P value refers to a ratio of the peak intensity ($I(1)$) derived from in-plane deformation vibration of an ethylenic unsaturated bond to the peak intensity ($I(2)$) derived from stretching vibration of an unsaturated bond of an aromatic ring in infrared total reflection absorption spectrum measurement. During curing (polymerization) of the polymerizable liquid crystal compound, the unsaturated bond of the aromatic ring is unreactive, whereas the ethylenic unsaturated bond disappears. Thus, by finding the P value in which the peak intensity of the unreactive unsaturated bond of the aromatic ring is a relative reference, it is possible to calculate an amount of the ethylenic unsaturated bond contained in the liquid crystal cured film. This makes it possible to calculate, based on $(1-P'/P0) \times 100$, a degree of polymerization of the liquid crystal cured film formed by polymerization of the polymerizable liquid crystal compound.

A value calculated based on $(1-P'/P0) \times 100$ is a value which is more than 50, preferably not less than 60, and more preferably not less than 65. Moreover, the value calculated based on $(1-P'/P0) \times 100$ is less than 85, preferably not more than 80, more preferably not more than 75, and still more preferably not more than 70. In a case where the value calculated based on $(1-P'/P0) \times 100$ is more than 50, the optical characteristic tends to be less decreased in a case where the laminated body is exposed to a high-temperature environment. Meanwhile, in a case where the value calculated based on $(1-P'/P0) \times 100$ is less than 85, the laminated body tends to exhibit a high optical characteristic (such as a wavelength dispersion property).

[Optically Anisotropic Layer]

The optically anisotropic layer included in the laminated body of the present invention is formed by curing a composition by polymerizing a polymerizable liquid crystal compound which is contained in the composition. The optically anisotropic layer can contain a polymer of a polymerizable liquid crystal compound which is described below. The optically anisotropic layer can be made up of a liquid crystal cured film which has been formed by curing the composition. Hereinafter, the composition is also referred to as a composition for optically anisotropic layer formation. The composition for optically anisotropic layer formation can contain a solvent and a photopolymerization initiator, in addition to the polymerizable liquid crystal compound. Moreover, the composition for optically anisotropic layer formation can further contain a sensitizer, a polymerization inhibitor, a leveling agent, an adherence improver, and the like.

The optically anisotropic layer in the laminated body of the present invention is normally formed by (i) applying the composition for optically anisotropic layer formation to an alignment film which has been provided on a base material and (ii) polymerizing the polymerizable liquid crystal compound which is contained in the composition for optically anisotropic layer formation.

The optically anisotropic layer is normally a film which (i) has been cured in a state where a polymerizable liquid crystal compound is aligned and (ii) has a thickness of not more than 5 μm. The optically anisotropic layer is preferably a liquid crystal cured film which has been cured in a state where a polymerizable liquid crystal compound is aligned in a direction parallel to or perpendicular to a surface of a base material.

A thickness of the optically anisotropic layer is preferably 0.5 μm to 5 μm, and more preferably 1 μm to 3 μm. The thickness of the optically anisotropic layer can be measured with use of an interference film thickness meter, a laser microscope, or a stylus type film thickness meter.

An optically anisotropic layer which has been cured in a state where a polymerizable liquid crystal compound is aligned in a direction parallel to a surface of a base material preferably has an in-plane phase difference value $R(\lambda)$ which (i) is with respect to light having a wavelength of $\lambda$ nm and (ii) satisfies an optical characteristic represented by Formula (1) below. The in-plane phase difference value $R(\lambda)$ of the optically anisotropic layer more preferably satisfies an optical characteristic represented by Formulae (1), (3), and (4) below. Formula (1) is preferably following Formula (1').

$$100 \text{ nm} < Re(550) < 160 \text{ nm} \quad (1)$$

$$100 \text{ nm} < Re(550) < 150 \text{ nm} \quad (1')$$

In Formula (1) and (1'), Re(550) represents an in-plane phase difference value (in-plane retardation) with respect to light having a wavelength of 550 nm.

$$Re(450)/Re(550) \leq 1.0 \quad (3)$$

$$1.00 \leq Re(650)/Re(550) \quad (4)$$

wherein: Re(450) represents an in-plane phase difference value with respect to light having a wavelength of 450 nm, Re(550) represents an in-plane phase difference value with respect to light having a wavelength of 550 nm, and Re(650) represents an in-plane phase difference value with respect to light having a wavelength of 650 nm.

"Re(450)/Re(550)" is more preferably not more than 0.9.

An optically anisotropic layer which has been cured in a state where a polymerizable liquid crystal compound is aligned in a direction perpendicular to a surface of a base material preferably satisfies the following Formula (5):

$$nz > nx \approx ny \quad (5)$$

wherein: nz represents a refractive index measured in a thickness direction of the liquid crystal cured film; nx represents the highest refractive index of refractive indices measured in an in-plane direction of the liquid crystal cured film; and ny represents an in-plane refractive index measured in a direction of the liquid crystal cured film which direction is perpendicular to the in-plane direction, in which nx is measured.

The in-plane phase difference value of the optically anisotropic layer can be controlled by adjusting the thickness of the optically anisotropic layer. The in-plane phase difference value is determined by the following Formula (50). Therefore, it is only necessary to adjust $\Delta n(\lambda)$ and a thickness "d" in order to obtain a desired in-plane phase difference value (Re($\lambda$)).

$$Re(\lambda) = d \times \Delta n(\lambda) \quad (50)$$

wherein: Re($\lambda$) represents an in-plane phase difference value at a wavelength of $\lambda$ nm; "d" represents a thickness; and $\Delta n(\lambda)$ represents a birefringence at the wavelength of $\lambda$ nm).

In a case of the optically anisotropic layer obtained by curing the composition in the state where the polymerizable liquid crystal compound is aligned in the direction perpendicular to the surface of the base material, Re(550) is preferably 0 (zero) nm to 10 nm, more preferably 0 (zero) nm to 5 nm. A phase difference value Rth in the thickness direction is preferably −10 nm to −300 nm, more preferably −20 nm to −200 nm. The optically anisotropic layer which satisfies Formula (5) and which has Re(550) and Rth in the respective foregoing ranges is particularly suitable for compensation for an in-plane switching (IPS) mode liquid crystal display device.

Rth can be calculated from (i) a phase difference value $R_{40}$ which is measured in a state where an in-plane fast axis is inclined by 40° as an inclined axis and (ii) an in-plane phase difference value $R_0$. That is, Rth can be calculated by (a) calculating nx, ny, and nz by the following Formulae (9) through (11) from (i) the in-plane phase difference value $R_0$, (ii) the phase difference value $R_{40}$ which is measured in the state where the in-plane fast axis is inclined by 40° as an inclined axis, (iii) the thickness "d" of the optically anisotropic layer, and (iv) an average refractive index $n_0$ of the optically anisotropic layer and (b) substituting nx, ny, and nz thus obtained into Formula (8).

$$Rth = [(nx+ny)/2 - nz] \times d \quad (8)$$

$$R_0 = (nx-ny) \times d \quad (9)$$

$$R_{40} = (nx-ny') \times d/\cos(\phi) \quad (10)$$

$$(nx+ny+nz)/3 = n_0 \quad (11)$$

wherein:
$\phi = \sin^{-1}[\sin(40°)/n_0]$
$ny' = ny \times nz/[ny^2 \times \sin^2(\phi) + nz^2 \times \cos^2(\phi)]^{1/2}$

[Polymerizable Liquid Crystal Compound]

The polymerizable liquid crystal compound of the present invention is a compound that has a polymerizable group and has liquid crystallinity. The polymerizable group, which means a group that is involved in a polymerization reaction, is preferably a photopolymerizable group. Note here that the photopolymerizable group refers to a group that can be involved in a polymerization reaction by, for example, an active radical or an acid generated from a photopolymerization initiator.

Examples of the polymerizable group include a vinyl group, a vinyloxy group, a 1-chlorovinyl group, an isopropenyl group, a 4-vinylphenyl group, an acryloyloxy group, a methacryloyloxy group, an oxiranyl group, an oxetanyl group, and the like. Of these polymerizable groups, a vinyloxy group, an acryloyloxy group, a methacryloyloxy group, an oxiranyl group, and an oxetanyl group are preferable, and an acryloyloxy group is more preferable. Liquid crystallinity can be achieved by thermotropic liquid crystal or lyotropic liquid crystal. Note, however, that liquid crystallinity is preferably achieved by thermotropic liquid crystal in terms of allowing a thickness of the liquid crystal cured film to be closely controlled. Alternatively, liquid crystallinity can also be achieved by nematic liquid crystal or smectic liquid crystal of thermotropic liquid crystal. From the viewpoint of easiness of production, liquid crystallinity is preferably achieved by nematic liquid crystal of thermotropic liquid crystal.

In terms of allowing the liquid crystal cured film to exhibit reciprocal wavelength dispersibility (described earlier), the polymerizable liquid crystal compound is preferably a polymerizable liquid crystal compound having a structure represented by the following Formula (I):

$$L\text{-}G\text{-}D\text{-}Ar\text{-}D\text{-}G\text{-}L \quad (I)$$

where Ar represents a substituted or unsubstituted bivalent aromatic group. This aromatic group refers to a group which has planarity and a ring structure whose p electron number is [4n+2] in accordance with Hückel rule where n represents an integer. In a case where the ring structure includes heteroatoms such as —N= and —S—, (i) a non-covalently bonded electron pair on these heteroatoms and (ii) pi electrons in the ring structure satisfy the Hückel rule. Such a case also encompasses a case where the ring structure has aromaticity. The bivalent aromatic group preferably contains at least one atom selected from the group consisting of a nitrogen atom, an oxygen atom, and a sulfur atom.

Two Ds are each independently a single bond or a bivalent linking group. Examples of D include a single bond or a bivalent linking group same as the $D^1$ and $D^2$ of the formula (A) which are described below.

Two Gs each independently represent a bivalent alicyclic hydrocarbon group. Examples of G include a bivalent alicyclic hydrocarbon group same as the $G^1$ and $G^2$ of the formula (A) which are described below.

Two Ls each independently represent a monovalent organic group, and at least one of the two Ls has a polymerizable group. Examples of L include a group same as the $L^1$ and $L^2$ of the formula (A) which are described below.

Ar preferably has at least one selected from a substituted or unsubstituted aromatic hydrocarbon ring, a substituted or unsubstituted heteroaromatic ring, and an electron-withdrawing group. The aromatic hydrocarbon ring, which is exemplified by a benzene ring, a naphthalene ring, an anthracene ring, and the like, is preferably a benzene ring or a naphthalene ring. Examples of the heteroaromatic ring include a furan ring, a benzofuran ring, a pyrrole ring, an indole ring, a thiophene ring, a benzothiophene ring, a pyridine ring, a pyrazine ring, a pyrimidine ring, a triazole ring, a triazine ring, a pyrroline ring, an imidazole ring, a pyrazole ring, a thiazole ring, a benzothiazole ring, a thienothiazole ring, an oxazole ring, a benzoxazole ring, a phenanthroline ring, and the like. Of these heteroaromatic rings, Ar preferably has a thiazole ring, a benzothiazole ring, or a benzofuran ring, and more preferably has a benzothiazole ring. In a case where Ar contains a nitrogen atom, the nitrogen atom preferably has a pi electron.

In Formula (I), a total number $N\pi$ of pi electrons contained in the bivalent aromatic group represented by Ar is preferably not less than 8, more preferably not less than 10, still more preferably not less than 14, and particularly preferably not less than 16. Further, the total number $N\pi$ is preferably not more than 30, more preferably not more than 26, and still more preferably not more than 24.

Examples of the aromatic group represented by Ar include the following groups:

[Chem. 1]

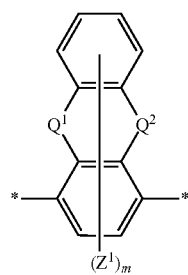
(Ar-1)

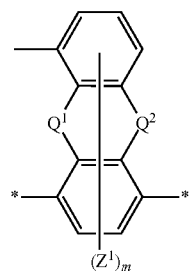
(Ar-2)

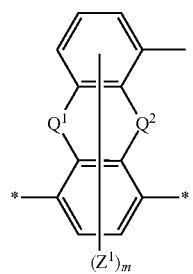
(Ar-3)

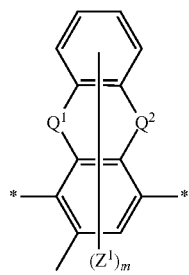
(Ar-4)

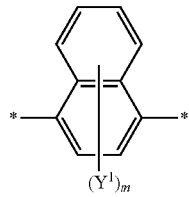
(Ar-5)

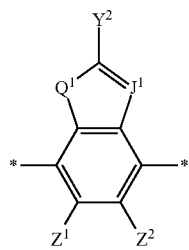
(Ar-6)

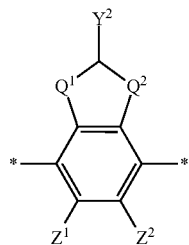
(Ar-7)

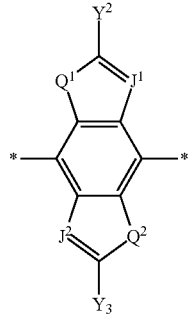
(Ar-8)

(Ar-9)

(Ar-10)
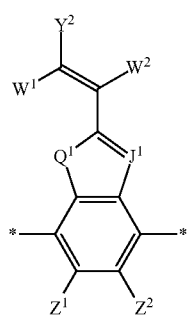
(Ar-11)
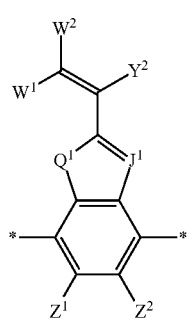
(Ar-12)
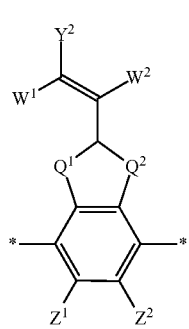
(Ar-13)
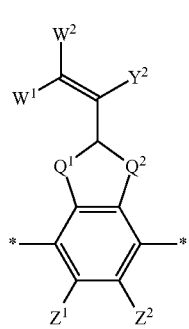
(Ar-14)
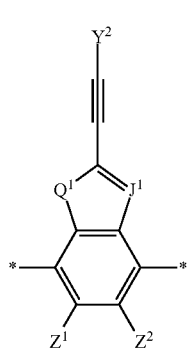
(Ar-15)
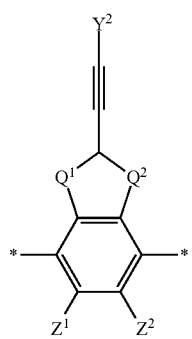
(Ar-16)
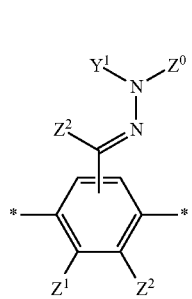
(Ar-17)
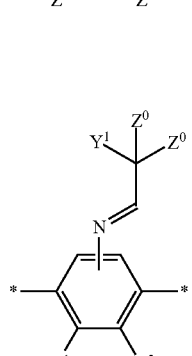
(Ar-18)
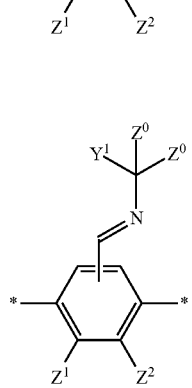
(Ar-19)
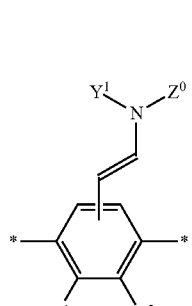

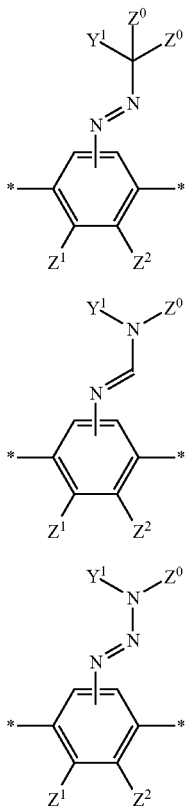

(Ar-20)

(Ar-21)

(Ar-22)

In Formulae (Ar-1) through (Ar-22), an asterisk * represents a connection, and $Z^0$, $Z^1$, and $Z^2$ each independently represent a hydrogen atom, a halogen atom, a C1-C12 alkyl group, a cyano group, a nitro group, a C1-C12 alkylsulfinyl group, a C1-C12 alkylsulfonyl group, a carboxyl group, a C1-C12 fluoroalkyl group, a C1-C6 alkoxy group, a C1-C12 alkylthio group, a C1-C12 N-alkylamino group, a C2-C12 N,N-dialkylamino group, a C1-C12 N-alkylsulfamoyl group, or a C2-C12 N,N-dialkylsulfamoyl group.

$Q^1$, $Q^2$, and $Q^3$ each independently represent —$CR^{2'}R^{3'}$—, —S—, —NH—, —$NR^{2'}$—, —CO—, or —O—, and $R^{2'}$ and $R^{3'}$ each independently represent a hydrogen atom or a C1-C4 alkyl group.

$J^1$ and $J^2$ each independently represent a carbon atom or a nitrogen atom.

$Y^1$, $Y^2$, and $Y^3$ each independently represent a substituted or unsubstituted aromatic hydrocarbon group or a substituted or unsubstituted heteroaromatic ring group.

$W^1$ and $W^2$ each independently represent a hydrogen atom, a cyano group, a methyl group, or a halogen atom, and m is an integer of 0 to 6.

Examples of the aromatic hydrocarbon group in $Y^1$, $Y^2$, and $Y^3$ include C6-C20 aromatic hydrocarbon groups such as a phenyl group, a naphthyl group, an anthryl group, a phenanthryl group, and a biphenyl group. Of these aromatic hydrocarbon groups, a phenyl group or a naphthyl group is preferable, and a phenyl group is more preferable. Examples of the heteroaromatic ring group in $Y^1$, $Y^2$, and $Y^3$ include C4-C20 heteroaromatic ring groups, each containing at least one heteroatom such as a nitrogen atom, an oxygen atom, or sulfur atom, such as a furyl group, a pyrrolyl group, a thienyl group, a pyridinyl group, a thiazolyl group, and benzothiazolyl group. Of these heteroaromatic ring groups, a furyl group, a thienyl group, a pyridinyl group, a thiazolyl group, or a benzothiazolyl group is preferable.

$Y^1$, $Y^2$, and $Y^3$ can be each independently a substituted or unsubstituted polycyclic aromatic hydrocarbon group or a substituted or unsubstituted polycyclic heteroaromatic ring group. A polycyclic aromatic hydrocarbon group refers to a condensed polycyclic aromatic hydrocarbon group or a group derived from an aromatic ring assembly. A polycyclic heteroaromatic ring group refers to a condensed polycyclic heteroaromatic ring group or a group derived from an aromatic ring assembly.

It is preferable that $Z^0$, $Z^1$, and $Z^2$ be each independently a hydrogen atom, a halogen atom, a C1-C6 alkyl group, a cyano group, a nitro group, or a C1-C12 alkoxy group. It is more preferable that $Z^0$ be a hydrogen atom, a C1-C12 alkyl group, or a cyano group. It is still more preferable that $Z^1$ and $Z^2$ be each a hydrogen atom, a fluorine atom, a chlorine atom, a methyl group, or a cyano group.

$Q^1$, $Q^2$, and $Q^3$ are each preferably —NH—, —S—, —$NR^{2'}$—, or —O—, and $R^{2'}$ is preferably a hydrogen atom. Of —NH—, —S—, —$NR^{2'}$—, and —O—, —S—, —O—, or —NH— is particularly preferable.

Of Formulae (Ar-1) through (Ar-22), Formulae (Ar-6) and (Ar-7) are preferable from the viewpoint of molecular stability.

In Formulae (Ar-16) through (Ar-22), together with $Z^0$ and a nitrogen atom to which $Y^1$ is bound, $Y^1$ can form a heteroaromatic ring group. Examples of the heteroaromatic ring group, which is exemplified by the heteroaromatic rings (mentioned earlier), each of which Ar can have, include a pyrrole ring, an imidazole ring, a pyrroline ring, a pyridine ring, a pyrazine ring, a pyrimidine ring, an indole ring, a quinoline ring, an isoquinoline ring, a purine ring, a pyrrolidine ring, and the like. The heteroaromatic ring group can have a substituent. Further, together with $Z^0$ and a nitrogen atom to which $Y^1$ is bound, $Y^1$ can be a substituted or unsubstituted polycyclic aromatic hydrocarbon group (described earlier) or a substituted or unsubstituted polycyclic heteroaromatic ring group (described earlier). Examples of the substituted or unsubstituted polycyclic aromatic hydrocarbon group or the substituted or unsubstituted polycyclic heteroaromatic ring group include a benzofuran ring, a benzothiazole ring, a benzoxazole ring, and the like.

The polymerizable liquid crystal compound is preferably a compound represented by the following formula (A) (hereinafter sometimes referred to as a compound (A)). Polymerizable liquid crystal compounds can be used in only one kind or in combination of two or more kinds. In a case where two or more kinds of polymerizable liquid crystal compounds are used in combination, at least one kind of the two or more kinds of polymerizable liquid crystal compounds is preferably the compound (A), and each of at least two kinds of the two or more kinds of polymerizable liquid crystal compounds is more preferably the compound (A).

[Chem. 2]

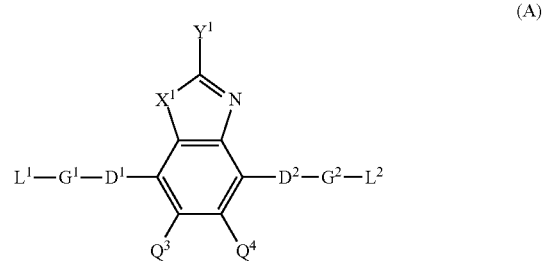

(A)

wherein: $X^1$ represents an oxygen atom, a sulfur atom, or —$NR^1$—; $R^1$ represents a hydrogen atom or a C1-C4 alkyl group; $Y^1$ represents a substituted or unsubstituted C6-C12 monovalent aromatic hydrocarbon group, or a substituted or unsubstituted C3-C12 monovalent aromatic heterocyclic group; $Q^3$ and $Q^4$ each independently represent a hydrogen atom, a substituted or unsubstituted C1-C20 monovalent aliphatic hydrocarbon group, a C3-C20 monovalent alicyclic hydrocarbon group, a substituted or unsubstituted C6-C20 monovalent aromatic hydrocarbon group, a halogen atom, a cyano group, a nitro group, —$NR^2R^3$, or —$SR^2$, or (i) $Q^3$ and (ii) $Q^4$, which are bound together, (iii) a carbon atom to which $Q^3$ is bound, and (iv) a carbon atom to which $Q^4$ is bound form an aromatic ring or a heteroaromatic ring; $R^2$ and $R^3$ each independently represent a hydrogen atom or a C1-C6 alkyl group; $D^1$ and $D^2$ each independently represent a single bond, —C(=O)—O—, —C(=S)—O—, —$CR^4R^5$—, —$CR^4R^5$—$CR^6R^7$—, —O—$CR^4R^5$—, —$CR^4R^5$—O—$CR^6R^7$—, —C(=O)—O—$CR^4R^5$—, —O—C(=O)—$CR^4R^5$—, —$CR^4R^5$—O—C(=O)—$CR^6R^7$—, —$CR^4R^5$—C(=O)—O—$CR^6R^7$—, —$NR^4$—$CR^5R^6$—, or —C(=O)—$NR^4$—; $R^4$, $R^5$, $R^6$, and $R^7$ each independently represent a hydrogen atom, a fluorine atom, or a C1-C4 alkyl group; $G^1$ and $G^2$ each independently represent a C5-C8 bivalent alicyclic hydrocarbon group whose methylene group can be replaced with an oxygen atom, a sulfur atom, or —NH— and whose methine group can be replaced with a tertiary nitrogen atom; and $L^1$ and $L^2$ each independently represent a monovalent organic group, and at least one of $L^1$ and $L^2$ has a polymerizable group. Note here that the polymerizable group is as described earlier.

$L^1$ in the compound (A) is preferably a group represented by the following formula (A1), and $L^2$ in the compound (A) is preferably a group represented by the following formula (A2).

$$P^1\text{—}F^1\text{—}(B^1\text{-}A^1)_k\text{-}E^1\text{-} \quad (A1)$$

$$P^2\text{—}F^2\text{—}(B^2\text{-}A^2)_l\text{-}E^2\text{-} \quad (A2)$$

wherein: $B^1$, $B^2$, $E^1$, and $E^2$ each independently represent —$CR^4R^5$—, —$CH_2$—$CH_2$—, —O—, —S—, —C(=O)—O—, —O—C(=O)—O—, —CS—O—, —O—C(=S)—O—, —C(=O)—$NR^1$—, —O—$CH_2$—, —S—$CH_2$—, or a single bond; $A^1$ and $A^2$ each independently represent a C5-C8 bivalent alicyclic hydrocarbon group whose methylene group can be replaced with an oxygen atom, a sulfur atom, or —NH— and whose methine group can be replaced with a tertiary nitrogen atom, or a C6-C18 bivalent aromatic hydrocarbon group; k and l each independently represent an integer of 0 to 3; $F^1$ and $F^2$ each independently represent a C1-C12 bivalent aliphatic hydrocarbon group; $P^1$ represents a hydrogen atom or a polymerizable group, and is preferably a polymerizable group; $P^2$ represents a hydrogen atom or a polymerizable group; at least one of $P^1$ and $P^2$ only needs to be a polymerizable group; and $R^4$ and $R^5$ each independently represent a hydrogen atom, a fluorine atom, or a C1-C4 alkyl group.

Preferable examples of the compound (A) include a polymerizable liquid crystal compound disclosed in Published Japanese Translation of PCT International Application, Tokuhyo, No. 2011-207765.

A polymerizable liquid crystal compound that differs from the compound (A) can be a compound that contains a group represented by the following formula (X) (hereinafter sometimes referred to as a compound (X)):

$$P^{11}\text{—}B^{11}\text{-}E^{11}\text{-}B^{12}\text{-}A^{11}\text{-}B^{13}\text{—} \quad (X)$$

wherein: $P^{11}$ represents a polymerizable group; $A^{11}$ represents a bivalent alicyclic hydrocarbon group or a bivalent aromatic hydrocarbon group, the bivalent alicyclic hydrocarbon group and the bivalent aromatic hydrocarbon group each contain a hydrogen atom that can be replaced with a halogen atom, a C1-C6 alkyl group, a C1-C6 alkoxy group, a cyano group, or a nitro group, and the C1-C6 alkyl group and the C1-C6 alkoxy group each contain a hydrogen atom that can be replaced with a fluorine atom; $B^{11}$ represents —O—, —S—, —C(=O)—O—, —O—C(=O)—, —O—C(=O)—O—, —C(=O)—$NR^{16}$—, —$NR^{16}$—C(=O)—, —C(=O)—, —CS—, or a single bond; $R^{16}$ represents a hydrogen atom or a C1-C6 alkyl group; $B^{12}$ and $B^{13}$ each independently represent —C≡C—, —CH=CH—, —$CH_2$—$CH_2$—, —O—, —S—, —C(=O)—, —C(=O)—O—, —O—C(=O)—, —O—C(=O)—O—, —CH=N—, —N=CH—, —N=N—, —C(=O)—$NR^{16}$—, —$NR^{16}$—C(=O)—, —$OCH_2$—, —$OCF_2$—, —$CH_2O$—, —$CF_2O$—, —CH=CH—C(=O)—O—, —O—C(=O)—CH=CH—, or a single bond; and $E^{11}$ represents a C1-C12 alkanediyl group whose hydrogen atom can be replaced with a C1-C5 alkoxy group whose hydrogen atom can be replaced with a halogen atom, and the C1-C12 alkanediyl group has —$CH_2$— that can be replaced with —O— or —C(=O)—. Specific examples of polymerizable liquid crystal compounds include: a polymerizable group-containing compound of compounds listed in "3.8.6 Nettowa-ku [Network] (Kannzenn kakyou-gata [Perfectly crosslinked type])" and "6.5.1 Ekisyou zairyou [Liquid crystal material] b. Jyuugousei nematikku ekisyou zairyou [Polymerizable nematic liquid crystal material]" of Ekisyou binnrann [Handbook of liquid crystals] (edited by Ekisyou binnrann hennsyuu iinnkai [Editorial committee of handbook of liquid crystals], published by MARUZEN Co., Ltd. on Oct. 30, 2000); polymerizable liquid crystal compounds disclosed in Japanese Patent Application Publication, Tokukai, No. 2010-31223, Japanese Patent Application Publication, Tokukai, No. 2010-270108, Japanese Patent Application Publication, Tokukai, No. 2011-6360, and Japanese Patent Application Publication, Tokukai, No. 2011-207765; and the like.

The polymerizable liquid crystal compound of the present invention preferably has a maximum absorption at a wavelength $\lambda_{max}(LC)$ which satisfies the following Formula (2):

$$300\text{ nm} \leq \lambda_{max}(LC) \leq 380\text{ nm} \quad (2)$$

In other words, for a purpose of protecting an element such as a liquid crystal display device or an EL display device from an ultraviolet ray, the optically anisotropic layer preferably has a maximum absorption at a wavelength in a range of not less than 300 nm and not more than 380 nm in which range the element may be deteriorated, and more preferably has a maximum absorption at a wavelength in a range of not less than 330 nm and not more than 380 nm. That is, the optically anisotropic layer is preferably made of a polymerizable liquid crystal compound which has a maximum absorption at a wavelength in a range of not less than 300 nm and not more than 380 nm, and more preferably made of a polymerizable liquid crystal compound which has a maximum absorption at a wavelength in a range of not less than 330 nm and not more than 380 nm.

An amount in which a total of the polymerizable liquid crystal compounds is contained in 100 parts by mass of a solid content of the composition for optically anisotropic layer formation is normally 70 parts by mass to 99.5 parts by mass, preferably 80 parts by mass to 99 parts by mass, more preferably 80 parts by mass to 94 parts by mass, and still more preferably 80 parts by mass to 90 parts by mass. The total which is contained in an amount falling within the above range tends to allow an optically anisotropic layer to be obtained to have an excellent alignment property. Note here that the solid content refers to a total amount of components in which a solvent has been excluded.

[Solvent]

The solvent is preferably a solvent that allows the polymerizable liquid crystal compound to be perfectly dissolved. Further, the solvent is preferably a solvent that is inactive in a polymerization reaction of the polymerizable liquid crystal compound.

Examples of the solvent include: alcohol solvents such as methanol, ethanol, ethylene glycol, isopropyl alcohol, propylene glycol, ethylene glycol methyl ether, ethylene glycol butyl ether, and propylene glycol monomethyl ether; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, 2-heptanone, and methyl isobutyl ketone; aliphatic hydrocarbon solvents such as pentane, hexane, and heptane; aromatic hydrocarbon solvents such as toluene and xylene; nitrile solvents such as acetonitrile; ether solvents such as tetrahydrofuran and dimethoxyethane; chlorine-containing solvents such as chloroform and chlorobenzene; and the like. These solvents can be used in only one kind or in combination of two or more kinds.

An amount in which the solvent is contained in 100 parts by mass of the composition is preferably 50 parts by mass to 98 parts by mass. Thus, a solid content of 100 parts by mass of the composition is preferably 2 parts by mass to 50 parts by mass. The solid content of the composition which solid content is not more than 50 parts by mass causes the composition to be less viscous, so that an optically anisotropic layer tends to be substantially uniform in thickness and less likely to be uneven. The solid content can be appropriately determined in view of a thickness of an optically anisotropic layer to be produced.

<Photopolymerization Initiator>

The photopolymerization initiator is more preferably a photopolymerization initiator that generates a radical by photoirradiation.

Examples of the photopolymerization initiator include a benzoin compound, a benzophenone compound, a benzil ketal compound, an α-hydroxyketone compound, an α-amino ketone compound, a triazine compound, an iodonium salt, and a sulfonium salt. Specific examples of the polymerization initiator include: Irgacure (Registered Trademark) 907, Irgacure 184, Irgacure 651, Irgacure 819, Irgacure 250, Irgacure 369, Irgacure 379, Irgacure 127, Irgacure 2959, Irgacure 754, and Irgacure 379EG (each manufactured by BASF Japan Ltd.); SEIKUOL BZ, SEIKUOL Z, and SEIKUOL BEE (each manufactured by Seiko Chemical Co., Ltd.); Kayacure BP100 (manufactured by Nippon Kayaku Co., Ltd.); Kayacure UVI-6992 (manufactured by The Dow Chemical Company); ADEKA OPTOMER SP-152, ADEKA OPTOMER SP-170, ADEKA OPTOMER N-1717, ADEKA OPTOMER N-1919, ADEKA ARKLS NCI-831, and ADEKA ARKLS NCI-930 (each manufactured by ADEKA CORPORATION); TAZ-A and TAZ-PP (each manufactured by NIHON SIBER HEGNER K.K.); and TAZ-104 (manufactured by SANWA CHEMICAL CO., LTD.).

The photopolymerization initiator contained in the composition for optically anisotropic layer formation is at least one photopolymerization initiator, and preferably one or two photopolymerization initiators.

It is preferable that at least one photopolymerization initiator is an oxime photopolymerization initiator which has an oxime structure in a molecule.

The oxime photopolymerization initiator generates a methyl radical in response to light irradiation. By the methyl radical, polymerization of the polymerizable liquid crystal compound is properly progressed in a deep part (which is on a side opposite to a side irradiated with light for forming an optically anisotropic layer and is an alignment film side in the laminated body of the present invention) of the optically anisotropic layer. Moreover, a bond between the alignment film and the photopolymerization initiator having the oxime structure increases adherence between the optically anisotropic layer and the alignment film. It is preferable to use the photopolymerization initiator having the oxime structure in the method for producing the laminated body of the present invention in which method an alignment film is formed on a base material, an optically anisotropic layer is formed on the alignment film, and then the base material is removed. This is because, when the base material is removed, the use of the photopolymerization initiator having the oxime structure makes it possible to remove only the base material while the alignment film remains.

In order to efficiently use an ultraviolet ray having a wavelength of less than 350 nm and an ultraviolet ray having a wavelength of not less than 350 nm, it is preferable to use, as the photopolymerization initiator of the present invention, two or more kinds of photopolymerization initiators that differ in main photosensitive wavelength.

As a photopolymerization initiator that can efficiently use an ultraviolet ray having a wavelength of less than 350 nm, an α-acetophenone compound is preferably used. Examples of the α-acetophenone compound include 2-methyl-2-morpholino-1-(4-methylsulfanilphenyl)propane-1-one, 2-dimethylamino-1-(4-morpholinophenyl)-2-benzil butane-1-one, 2-dimethylamino-1-(4-morpholinophenyl)-2-(4-methylphenylmethyl)butane-1-one, and the like. More preferable examples of the α-acetophenone compound include 2-methyl-2-morpholino-1-(4-methylsulfanilphenyl)propane-1-one and 2-dimethylamino-1-(4-morpholinophenyl)-2-benzil butane-1-one. Examples of commercially-available products of the α-acetophenone compound include Irgacure 369, Irgacure 379EG, and Irgacure 907 (each manufactured by BASF Japan Ltd.), SEIKUOL BEE (manufactured by Seiko Chemical Co., Ltd.), and the like.

From the viewpoint that a polymerization reaction that occurs in a deep part of an optically anisotropic layer is more efficiently progressed, a photopolymerization initiator that can efficiently use an ultraviolet ray having a wavelength of not less than 350 nm is preferably used. For example, it is possible to use a photopolymerization initiator whose absorbance of light having a wavelength of 350 nm is not less than 0.10, in 100 mL of a chloroform solution containing 1 mg of the photopolymerization initiator. As the photopolymerization initiator that can efficiently use an ultraviolet ray having a wavelength of not less than 350 nm, a triazine compound or an oxime ester carbazole compound is preferable, and an oxime ester carbazole compound is more preferable from the viewpoint of sensitivity. Examples of the oxime ester carbazole compound include 1,2-octanedione, 1-[4-(phenylthio)-2-(O-benzoyloxime)], ethanone, 1-[9-ethyl-6-(2-methylbenzoyl)-9H-carbazole-3-yl]-1-(O-acetyloxime), and the like. Examples of commercially-available products of the oxime ester carbazole compound include Irgacure OXE-01, Irgacure OXE-02, and Irgacure OXE-03 (each manufactured by BASF Japan Ltd.), ADEKA OPTOMER N-1919 and ADEKA ARKLS NCI-831 (each manufactured by ADEKA CORPORATION), and the like.

From the viewpoint that a polymerization reaction is more efficiently progressed, the photopolymerization initiator preferably has two or more maximum absorptions at a wavelength in a range of not less than 300 nm. Examples of the photopolymerization initiator which has two or more maximum absorptions at a wavelength in a range of not less than 300 nm include ADEKA ARKLS NCI-831 (manufactured by ADEKA CORPORATION), Irgacure OXE-03 (manufactured by BASF Japan Ltd.), and the like.

The photopolymerization initiator is added in an amount normally of 0.1 parts by mass to 30 parts by mass, preferably of 1 part by mass to 20 parts by mass, and more preferably of 3 parts by mass to 18 parts by mass, relative to 100 parts by mass of the polymerizable liquid crystal compound. That is, a ratio of a total amount of the photopolymerization initiator relative to a total amount of the polymerizable liquid crystal compound is normally 0.1 mass % to 30 mass %, preferably 1 mass % to 20 mass %, and more preferably 3 mass % to 18 mass %. The photopolymerization initiator which is added in an amount falling within the above range is less likely to disturb alignment of the polymerizable liquid crystal compound.

[Sensitizer]

The composition for optically anisotropic layer formation which composition contains a sensitizer makes it possible to further promote a polymerization reaction of the polymerizable liquid crystal compound when an optically anisotropic layer is formed.

The sensitizer is preferably a photosensitizer. Examples of the sensitizer include: xanthone compounds such as xanthone and thioxanthone (e.g., 2,4-diethyl thioxanthone, 2-isopropyl thioxanthone, etc.); anthracene compounds such as anthracene and alkoxy group-containing anthracene (e.g., dibutoxyanthracene); phenothiazine; rubrene; and the like.

In the composition for optically anisotropic layer formation, the sensitizer is contained in an amount preferably of 0.1 parts by mass to 30 parts by mass, more preferably of 0.5 parts by mass to 10 parts by mass, and still more preferably of 0.5 parts by mass to 8 parts by mass, relative to 100 parts by mass of the polymerizable liquid crystal compound.

[Polymerization Inhibitor]

Use of the polymerization inhibitor makes it possible to control a degree of progress of the polymerization reaction of the polymerizable liquid crystal compound when an optically anisotropic layer is formed.

The polymerization inhibitor is exemplified by radical capture agents such as (i) phenolic compounds such as 2,6-di-tert-butyl-4-methylphenol, (ii) sulfuric compounds such as dilauryl thiodipropionate, (iii) phosphorous compounds such as trioctyl phosphite, (iv) hindered amine structure-containing amine compounds typified by 2,2,6,6-tetramethylpiperidine, and (v) the like.

From the viewpoint that the optically anisotropic layer in the laminated body of the present invention is less colored, a phenolic compound is preferable as the polymerization inhibitor.

In the composition for optically anisotropic layer formation, the polymerization inhibitor is contained in an amount preferably of 0.1 parts by mass to 30 parts by mass, more preferably of 0.5 parts by mass to 10 parts by mass, and still more preferably of 0.5 parts by mass to 8 parts by mass, relative to 100 parts by mass of the polymerizable liquid crystal compound. The polymerization inhibitor which is contained in an amount falling within the above range makes it possible to polymerize the polymerizable liquid crystal compound without disturbing alignment of the polymerizable liquid crystal compound, and thus such a polymerization inhibitor is preferable. Polymerization inhibitors can be used in only one kind or in combination of two or more kinds.

[Leveling Agent]

The leveling agent, which is an additive that has a function of adjusting fluidity of a composition so as to further level a film to be obtained by application of the composition, is exemplified by a surfactant. Preferable examples of the leveling agent include: a leveling agent whose main component is a polyacrylate compound, such as "BYK-361N" (manufactured by BYK Chemie); and a leveling agent whose main component is a fluorine atom-containing compound, such as Surflon (Registered Trademark) "S-381" (manufactured by AGC SEIMI CHEMICAL CO., LTD.).

In the composition for optically anisotropic layer formation, the leveling agent is contained in an amount preferably of 0.01 parts by mass to 5 parts by mass, and more preferably of 0.1 parts by mass to 3 parts by mass, relative to 100 parts by mass of the polymerizable liquid crystal compound. The leveling agent which is contained in an amount falling within the above range (i) makes it easy to parallelly align the polymerizable liquid crystal compound and (ii) tends to make an optically anisotropic layer to be obtained flatter and smoother. Thus, such a leveling agent is preferable. The composition for optically anisotropic layer formation can contain two or more kinds of leveling agents.

[Adherence Improver]

In a case where an adherence improver is contained in the composition for optically anisotropic layer formation, adherence between an optically anisotropic layer to be formed and an alignment film is increased. Therefore, it is preferable that the composition for optically anisotropic layer formation contains an adherence improver in the method for producing the laminated body of the present invention in which method an alignment film is formed on a base material, an optically anisotropic layer is formed on the alignment film, and then the base material is removed. This is because only the base material can be properly removed while the alignment film remains.

In a case where the adherence improver is a compound having a cross-linking structure including two or more foregoing polymerizable groups in 1 (one) molecule, adherence can be given in UV irradiation. Examples of the adherence improver include multifunctional acrylate and multifunctional thiol. In a case where the adherence improver is a compound having an epoxy structure or an isocyanate structure, adherence can be given in drying by heating. Selecting a compound which reacts with both light and heat is further effective.

Concrete examples of the adherence improver include a compound (e.g., methacryloxyglycidyl ether, acryloxyglycidyl ether) having a (meth)acrylic group and an epoxy group; a compound (e.g., oxetane acrylate, oxetane methacrylate) having a (meth)acrylic group and an oxetane group; a compound (e.g., lactone acrylate, lactone methacrylate) having a (meth)acrylic group and a lactone group; a compound (e.g., vinyloxazoline, isopropenyloxazoline) having a vinyl group and an oxazoline group; and an oligomer of compounds (e.g., isocyanatomethylacrylate, isocyanatomethylmethacrylate, 2-isocyanatoethylacrylate, 2-isocyanatoethylmethacrylate, and the like) each having a (meth)acrylic group and an isocyanate group. Moreover, the adherence improver can be a compound (e.g., methacrylic acid anhydride, acrylic acid anhydride, maleic anhydride, vinyl maleic anhydride, and the like) having a vinyl group or a vinylene group and an acid anhydride. Among those, the adherence improver is preferably methacryloxyglycidyl ether, acryloxyglycidyl ether, isocyanatomethylacrylate, isocyanatomethylmethacrylate, vinyloxazoline, 2-isocyanatoethylacrylate, 2-isocyanatoethylmethacrylate, or the oligomer, and particularly preferably isocyanatomethylacrylate, 2-isocyanatoethylacrylate, or the oligomer.

Specifically, the adherence improver is preferably a compound represented by the following formula (Y):

[Chem. 3]

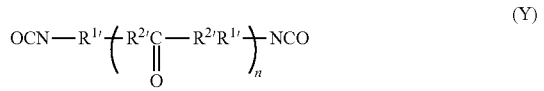

(Y)

wherein: "n" represents an integer of 1 to 10; and $R^{1'}$ represents a C2-C20 bivalent aliphatic or alicyclic hydrocarbon group or a C5-C20 bivalent aromatic hydrocarbon group. One of two $R^{2'}$ which are in each repeating unit is a group represented by —NH— and the other of the two $R^{2'}$ is a group represented by >N—C(=O)—$R^{3'}$. $R^{3'}$ represents a hydroxyl group or a group having a carbon-carbon unsaturated bond.

At least one $R^{3'}$ in the formula (Y) is the group having the carbon-carbon unsaturated bond.

Among adherence improvers represented by the formula (Y), a compound (hereinafter sometimes referred to as a compound (YY)) represented by the following formula (YY) is particularly preferable (note that "n" has a meaning identical with that described above).

[Chem. 4]

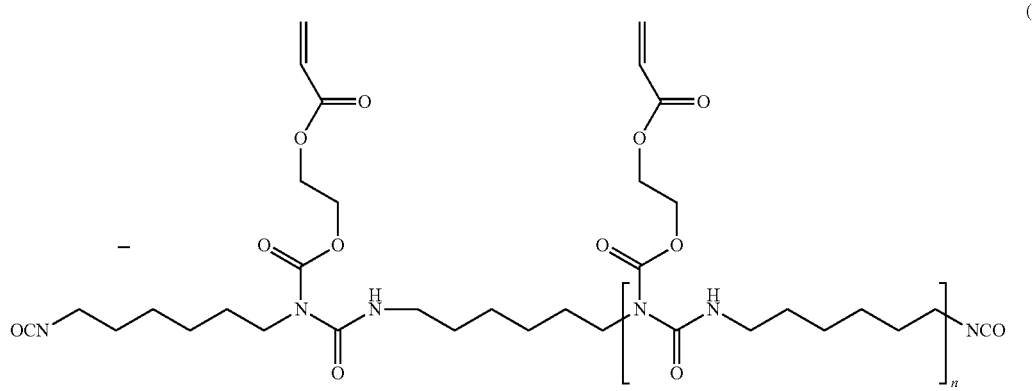

(YY)

The compound (YY) can be a commercially-available product as it is or a commercially-available product which is purified as needed. Examples of the commercially-available product include Laromer (Registered Trademark) LR-9000 (manufactured by BASF Japan Ltd.) EBECRYL Series (manufactured by DAICEL-ALLNEX LTD.), Karenz Series (manufactured by Showa Denko K.K.), and the like.

[Base Material]

The base material, which is exemplified by a glass base material and a plastic base material, is preferably a plastic base material. Examples of plastic of which the plastic base material is made include plastics such as polyolefins such as polyethylene, polypropylene, and a norbornene polymer; cyclic olefinic resins; polyvinyl alcohol; polyethylene terephthalate; polymethacrylic acid ester; polyacrylic ester; cellulose esters such as triacetyl cellulose, diacetyl cellulose, and cellulose acetate propionate; polyethylene naphthalate; polycarbonate; polysulfone; polyether sulfone; polyether ketone; polyphenylene sulfide and polyphenylene oxide; and the like.

Examples of a commercially-available cellulose ester base material include: "Fuji TAC film" (manufactured by FujiFilm Corporation); "KC8UX2M", "KC8UY", and "KC4UY" (each manufactured by KONICA MINOLTA JAPAN, INC.); and the like.

Examples of commercially-available cyclic olefinic resins include "Topas" (Registered Trademark) (manufactured by Ticona (Germany)), "ARTON" (Registered Trademark) (manufactured by JSR Corporation), "ZEONOR" (Registered Trademark) and "ZEONEX" (Registered Trademark) (each manufactured by Zeon Corporation), and "APEL" (Registered Trademark) (manufactured by Mitsui Chemicals, Inc.). Such a cyclic olefinic resin can be made into the base material by film formation by publicly-known means such as a solvent cast method or a melt extrusion method. It is also possible to use a commercially-available cyclic olefinic resin base material. The commercially-available cyclic olefinic resin base material is exemplified by "Esushina" (Registered Trademark) and "SCA40" (Registered Trademark) (each manufactured by SEKISUI CHEMICAL CO., LTD.), "ZEONOR FILM" (Registered Trademark) (manufactured by Optes Co., Ltd.), and "ARTON FILM" (Registered Trademark) (manufactured by JSR Corporation).

The base material preferably has a small thickness in that the base material which is thin has a small mass (is light) and thus can be practically treated (is easy to industrially treat). Note, however, that the base material which has a too small thickness tends to be lower in strength and inferior in processability. The base material has a thickness normally of 5 μm to 300 μm and preferably of 20 μm to 200 μm.

[Alignment Film]

The alignment film included in the laminated body of the present invention is a film that has an alignment regulating force by which the polymerizable liquid crystal compound is subjected to liquid crystal alignment in a desired direction. The alignment film is exemplified by an alignment film made of an alignment polymer, a photoalignment film, and a groove alignment film.

The alignment film facilitates liquid crystal alignment of the polymerizable liquid crystal compound. States of liquid crystal alignment such as parallel alignment, perpendicular alignment, hybrid alignment, and tilt alignment change in accordance with a property of the alignment film and a property of the polymerizable liquid crystal compound, and it is optionally selectable how to combine the above states. In a case where the alignment film is a material that serves as the alignment regulating force by which to cause parallel alignment, the polymerizable liquid crystal compound can be subjected to parallel alignment or hybrid alignment. In a case where the alignment film is a material that serves as the alignment regulating force by which to cause perpendicular alignment, the polymerizable liquid crystal compound can be subjected to perpendicular alignment or tilt alignment. Assuming that a plane of an optically anisotropic layer is a reference, the expressions such as "parallel" and "perpendicular" each refer to a direction in which a long axis of the polymerizable liquid crystal compound aligned extends. Parallel alignment refers to alignment such that the polymerizable liquid crystal compound aligned has a long axis that extends in a direction parallel to the plane of the optically anisotropic layer. The term "parallel" herein means an angle of 0°±20° with respect to the plane of the optically anisotropic layer. Perpendicular alignment refers to alignment such that the polymerizable liquid crystal compound aligned has a long axis that extends in a direction perpendicular to the plane of the optically anisotropic layer. The term "perpendicular" herein means an angle of 90°±20° with respect to the plane of the optically anisotropic layer.

In a case where the alignment film is made of an alignment polymer, the alignment regulating force can be optionally adjusted in accordance with a state of a surface of the alignment polymer and/or a rubbing condition. In a case where the alignment film is made of a photoalignment polymer, the alignment regulating force can be optionally adjusted in accordance with, for example, a condition under which to irradiate the photoalignment polymer with polarized light. Liquid crystal alignment of the polymerizable liquid crystal compound can also be controlled by selecting physical properties of the polymerizable liquid crystal compound, such as surface tension and liquid crystallinity.

In a case where an optically anisotropic layer satisfies Formula (5), liquid crystal alignment of the polymerizable liquid crystal compound of which the optically anisotropic layer is made is preferably perpendicular alignment. In order to perpendicularly align the polymerizable liquid crystal compound, it is preferable to use an alignment film that has a nonpolar substituent containing, for example, a silicon atom and a fluorine atom. As such an alignment film, it is possible to use a material that is generally used as a liquid crystal alignment film of a perpendicular alignment liquid crystal display element and is exemplified by materials disclosed in Japanese Patent No. 4605016, Japanese Patent No. 4985906, Japanese Patent No. 4502119, and International Publication No. WO2008/117760.

An alignment film that is provided between a base material and an optically anisotropic layer is preferably a film that is insoluble in a solvent to be used to provide an optically anisotropic layer on the alignment film and is resistant to heat during a heat treatment for removal of the solvent and liquid crystal alignment. The alignment film is exemplified by an alignment film made of an alignment polymer, a photoalignment film, a groove alignment film, and the like.

The alignment film has a thickness normally of 10 nm to 500 nm and preferably of 10 nm to 200 nm.

[Alignment Film Made of Alignment Polymer]

An alignment film made of an alignment polymer is normally obtained by applying, to a base material, a composition in which an alignment polymer is dissolved in a solvent (hereinafter sometimes referred to as an alignment polymer composition), and removing the solvent, or by applying the alignment polymer composition to the base material, removing the solvent, and carrying out rubbing (a rubbing method).

The alignment polymer contained in the alignment polymer composition only needs to have a concentration falling within a range that allows material(s) of the alignment polymer to be completely dissolved in the solvent. The concentration is preferably 0.1 mass % to 20 mass %, and more preferably 0.1 mass % to 10 mass % in solid content terms, relative to the solution.

A commercially-available alignment polymer composition is exemplified by, for example, SUNEVER (Registered Trademark) (manufactured by NISSAN CHEMICAL INDUSTRIES, LTD.) and OPTMER (Registered Trademark) (manufactured by JSR Corporation).

As a method for applying the alignment polymer composition to the base material, a known method can be employed. Examples of the known method include: application methods such as spin coating, extrusion, gravure coating, die coating, bar coating, and an applicator method; and printing methods such as flexography.

The solvent contained in the alignment polymer composition is removed, and thus a dry film of the alignment polymer is formed. Examples of a method for removing the solvent include natural drying, draught drying, drying by heating, drying under reduced pressure, and the like.

A rubbing method can be a method in which an alignment polymer film, which has been formed on a surface of a base material by applying an alignment polymer composition to the base material and annealing the alignment polymer composition, is brought into contact with a rubbing roller which is wound with a rubbing cloth and is rotating.

[Photoalignment Film]

A photoalignment film is normally obtained by applying, to a base material, a composition containing a photoreactive group-containing polymer or a photoreactive group-containing monomer (photoalignment material) and a solvent (hereinafter sometimes referred to as a composition for photoalignment film formation), and irradiating, with polarized light (preferably polarized UV), the base material to which the composition has been applied. The photoalignment film is more preferable in that a direction of the alignment regulating force can be optionally controlled by selecting a direction of polarized light with which to irradiate the base material to which the composition has been applied.

A photoreactive group refers to a group that generates liquid crystal alignment power by light irradiation. Specifically, a photoreactive group is a group that causes a photoreaction in which liquid crystal alignment power originates, such as molecular alignment induction or a molecular isomerization reaction caused by light irradiation, a dimerization reaction caused by light irradiation, a photocrosslinking reaction caused by light irradiation, or a photolysis reaction caused by light irradiation. In particular, a photoreactive group that causes a dimerization reaction or a photocrosslinking reaction is preferable in terms of excellence in alignment property. As a photoreactive group that can cause the above reaction, a group that has an unsaturated bond, particularly a double bond is preferable, and a group that has at least one bond selected from the group consisting of a carbon-carbon double bond (C═C bond), a carbon-nitrogen double bond (C═N bond), a nitrogen-nitrogen double bond (N═N bond), and a carbon-oxygen double bond (C═O bond) is particularly preferable.

Examples of the photoreactive group having a C═C bond include a vinyl group, a polyene group, a stilbene group, a stilbazole group, a stilbazolium group, a chalcone group, a cinnamoyl group, and the like. Examples of the photoreactive group having a C═N bond include groups having structures such as aromatic Schiff base and aromatic hydrazone. Examples of the photoreactive group having an N═N bond include an azobenzene group, an azonaphtalene group, a heteroaromatic ring azo group, a bisazo group, a formazan group, and the like and a group having azoxybenzene as a basic structure. Examples of the photoreactive group having a C═O bond include a benzophenone group, a coumarin group, an anthraquinone group, a maleimide group, and the like. These groups can have any of substituents such as an alkyl group, an alkoxy group, an aryl group, an allyloxy group, a cyano group, an alkoxycarbonyl group, a hydroxyl group, a sulfonic group, an alkyl halide group, and the like.

Among those, it is preferable to employ a photoreactive group which is involved in a photodimerization, and the cinnamoyl group and the chalcone group are preferable because an amount of polarized radiation necessary for photoalignment is relatively small and a photoalignment layer which is excellent in thermal stability and in temporal stability is more likely to be obtained. A polymer having a photoreactive group is particularly preferably a polymer having a cinnamoyl group in which a terminal of a polymer-side chain has a cinnamic acid structure.

The alignment film which is included in the laminated body of the present invention is particularly preferably an alignment film which is made of a monomer or a polymer that expresses alignment regulating force by a photodimerization, that is, a photoalignment film which causes a photodimerization. In a case where the alignment film included in the laminated body of the present invention is the photoalignment film which causes a photodimerization, it is possible to cause a bond between the polymerizable liquid crystal compound and the photoalignment film in polymerization of the polymerizable liquid crystal compound, and consequently to enhance adhesion between the photoalignment film and the optically anisotropic layer.

The solvent in the composition for photoalignment film formation is preferably a solvent which dissolves a polymer and a monomer having a photoreactive group, and the solvent can be any of the solvents exemplified as the solvent in the alignment polymer composition.

The photoreactive group-containing polymer or the photoreactive group-containing monomer is contained in an amount preferably of not less than 0.2 mass %, and particularly preferably of 0.3 mass % to 10 mass %, relative to the composition for photoalignment film formation. The composition for photoalignment film formation can contain polymeric materials such as polyvinyl alcohol and polyimide, and/or a photosensitizer, provided that a characteristic of the photoalignment film is not seriously impaired.

A method for applying the composition for photoalignment film formation to a base material can be a method similar to the method for applying the alignment polymer composition to a base material. A method for removing the solvent from the composition for photoalignment film formation can be a method identical with the method for removing the solvent from the alignment polymer composition.

Polarized light irradiation can be carried out in a mode in which a composition obtained by removing the solvent from the composition for photoalignment film formation, the composition having been applied to the base material, is directly irradiated with polarized light, or in a mode in which the composition is irradiated with polarized light that is incident on the base material and then is transmitted through the base material. The polarized light is particularly preferably substantially parallel light. Polarized light with which to irradiate the composition desirably has a wavelength in a wavelength region in which a photoreactive group of the photoreactive group-containing polymer or the photoreactive group-containing monomer can absorb light energy. Specifically, the polarized light with which to irradiate the composition is particularly preferably UV (ultraviolet ray) having a wavelength of 250 nm to 400 nm. Examples of a light source that is used in the polarized radiation include a xenon lamp, a high pressure mercury lamp, an extra-high pressure mercury lamp, a metal halide lamp, and an ultraviolet light laser such as KrF or ArF. Out of those examples, a high pressure mercury lamp, an extra-high pressure mercury lamp, or a metal halide lamp is more preferably used. These lamps are preferable because of achieving a high light emission intensity in emitting an ultraviolet ray at a wavelength of 313 nm. By causing the light source to emit light so that the light passes through an appropriate polarizer, it is possible to emit polarized light. Examples of the polarizer include: a polarizing filter; polarizing prisms such as a Glan-Thompson prism and a Glan-Taylor prism; and a wire grid type polarizer.

Note that, in a case where masking is carried out during rubbing or polarized light irradiation, it is possible to form a plurality of regions (patterns) that differ in direction of liquid crystal alignment.

[Groove Alignment Film]

A groove alignment film is a film whose surface is provided with an uneven pattern or a plurality of grooves. In a case where the polymerizable liquid crystal compound is applied to a film having a plurality of linear grooves that are provided at regular intervals, liquid crystal molecules are aligned in a direction along those grooves.

A method for obtaining the groove alignment film is exemplified by, for example, (i) a method in which a surface of a photosensitive polyimide film is exposed to light via an exposure mask having a pattern-shaped slit, and then an uneven pattern is formed by carrying out development and a rinse treatment, (ii) a method in which a plate-like matrix whose surface is provided with a groove is provided with a resin layer of a UV cured resin which has not been cured, and then the resin layer is cured after being moved to a base material, and (iii) a method in which irregularities are formed by pressing a roll matrix having a plurality of grooves against a film, provided on the base material, of the UV cured resin which has not been cured, and then the film is cured. The method for obtaining the groove alignment film is specifically exemplified by, for example, methods disclosed in Japanese Patent Application Publication, Tokukaihei, No. 6-34976 (1994) and Japanese Patent Application Publication, Tokukai, No. 2011-242743.

[Adhesive Agent Layer]

An adhesive agent layer is formed from an adhesive agent. Examples of the adhesive agent include a pressure-sensitive adhesive, a dry hardening adhesive agent, and a chemical reaction adhesive agent. The chemical reaction adhesive agent can be, for example, an active energy ray curing adhesive agent. The adhesive agent layer is preferably made of a pressure-sensitive adhesive or an active energy ray curing adhesive agent.

[Pressure-Sensitive Adhesive]

A pressure-sensitive adhesive normally contains a polymer and can contain a solvent.

Examples of the polymer include an acrylic polymer, a silicone polymer, polyester, polyurethane, polyether, and the like. It is preferable to employ an acrylic adhesive which contains an acrylic polymer among these, because such an acrylic pressure-sensitive adhesive is excellent in optical transparency, has moderate wettability and cohesive force, is excellent in adhesiveness, has high weatherability, heat resistance, and the like, and hardly causes floating, peeling, or the like under conditions of heating and/or humidification.

The acrylic polymer is preferably a copolymer of (i) (meth)acrylate in which an alkyl group of an ester moiety is a C1-C20 alkyl group such as a methyl group, an ethyl group, or a butyl group (hereinafter, acrylate and methacrylate are sometimes collectively referred to as "(meth)acrylate", and acrylic acid and methacrylic acid are sometimes collectively referred to as "(meth)acrylic acid") and (ii) a (meth)acrylic monomer having a functional group such as (meth)acrylic acid or hydroxyethyl (meth)acrylate.

It is preferable to employ an adhesive which contains the copolymer because such a pressure-sensitive adhesive is excellent in adhesion and the adhesive which has been provided on the display device can be relatively easily removed from the display device without causing residual adhesive and/or the like. A glass transition temperature of the acrylic polymer is preferably 25° C. or lower, and more preferably 0° C. or lower. A mass average molecular weight of the acrylic polymer is preferably not less than 100 thousand.

Examples of the solvent include the solvents and the like which have been exemplified as the solvent for the alignment polymer composition.

The pressure-sensitive adhesive can contain a light diffusing agent. The light diffusing agent only needs to be an additive which (i) gives a light diffusing property to a pressure-sensitive adhesive and (ii) is in a form of fine particles having a refractive index different from that of a polymer contained in the pressure-sensitive adhesive. Examples of the light diffusing agent include fine particles of an inorganic compound and fine particles of an organic compound (polymer). Many polymers (including an acrylic polymer) each of which is contained in the pressure-sensitive adhesive as an active ingredient have a refractive index of approximately 1.4, and therefore it is preferable to appropriately select a light diffusing agent which has a refractive index of 1 to 2. A difference in refractive index between a polymer contained in the pressure-sensitive adhesive as an active ingredient and the light diffusing agent is normally not less than 0.01, and preferably 0.01 to 0.5 from the viewpoint of brightness and display performance of the display device. The fine particles used as the light diffusing agent are preferably fine particles having a spherical shape (furthermore, almost monodispersed fine particles), and more preferably fine particles whose average particle size is 2 μm to 6 μm.

A refractive index is measured with a general minimum deviation method or an Abbe refractometer.

Examples of the fine particles of the inorganic compound include aluminum oxide (having a refractive index of 1.76), silicon oxide (having a refractive index of 1.45), and the like.

Examples of the fine particles of the organic compound (polymer) include melamine beads (having a refractive index of 1.57), polymethyl methacrylate beads (having a refractive index of 1.49), methyl methacrylate/styrene copolymer resin beads (having a refractive index of 1.50 to 1.59), polycarbonate beads (having a refractive index of 1.55), polyethylene beads (having a refractive index of 1.53), polystyrene beads (having a refractive index of 1.6), polyvinyl chloride beads (having a refractive index of 1.46), silicone resin beads (having a refractive index of 1.46), and the like.

The light diffusing agent is contained in an amount normally of 3 parts by mass to 30 parts by mass, relative to 100 parts by mass of a polymer.

A haze value of the adhesive agent layer formed from a pressure-sensitive adhesive in which the light diffusing agent is dispersed is preferably 20% to 80%, from the viewpoint of securing brightness of the display device and hardly causing bleeding and a blur in a displayed image. The haze value is a value expressed by "(diffuse transmittance/total light transmittance)×100(%)" and is measured in conformity to JIS K 7105.

A thickness of the adhesive agent layer formed from the pressure-sensitive adhesive is determined in accordance with adhesion and the like of the adhesive agent layer, and is not limited to a particular one. Normally, the thickness of the adhesive agent layer is 1 μm to 40 μm. In view of processability, durability, and the like, the thickness is preferably 3 μm to 25 μm, and more preferably 5 μm to 20 μm. In a case where the thickness of the adhesive agent layer formed from the pressure-sensitive adhesive is 5 μm to 20 μm, it is possible to (i) maintain brightness when the display device is viewed from front or viewed obliquely and (ii) hardly cause bleeding and a blur in a displayed image.

[Dry Hardening Adhesive Agent]

The dry hardening adhesive agent can contain a solvent.

Examples of the dry hardening adhesive agent include a polymer of monomers having (i) a protic functional group such as a hydroxyl group, a carboxyl group, or an amino group and (ii) an unsaturated ethylene group; a composition which contains urethane resin as a main component and further contains a crosslinking agent or a curable compound such as polyvalent aldehyde, an epoxy compound, epoxy resin, a melamine compound, a zirconia compound, or a zinc compound; and the like.

Examples of the polymer of monomers having (i) a protic functional group such as a hydroxyl group, a carboxyl group, or an amino group and (ii) an unsaturated ethylene group include an ethylene-maleic acid copolymer, an itaconic acid copolymer, an acrylic acid copolymer, an acrylamide copolymer, saponified polyvinyl acetate, polyvinyl alcohol resin, and the like.

Examples of the polyvinyl alcohol resin include polyvinyl alcohol, partially saponified polyvinyl alcohol, completely saponified polyvinyl alcohol, carboxyl group modified polyvinyl alcohol, acetoacetyl group modified polyvinyl alcohol, methylol group modified polyvinyl alcohol, amino group modified polyvinyl alcohol, and the like. An amount of polyvinyl alcohol resin contained in a water-based adhesive agent is normally 1 part by mass to 10 parts by mass, and preferably 1 part by mass to 5 parts by mass, relative to 100 parts by mass of water.

The urethane resin can be polyester ionomer urethane resin or the like. The polyester ionomer urethane resin is urethane resin which has a polyester skeleton and to which a small amount of an ionic component (hydrophilic component) is introduced. Such ionomer urethane resin becomes an emulsion by being emulsified in water without using an emulsifier, and can therefore be used as a water-based adhesive agent. In a case where the polyester ionomer urethane resin is used, addition of a water-soluble epoxy compound as a crosslinking agent is effective.

Examples of the epoxy resin include polyamide epoxy resin which is obtained by causing epichlorohydrin to react with polyamide polyamine which has been obtained by causing polyalkylene polyamine such as diethylenetriamine or triethylenetetramine to react with dicarboxylic acid such as adipic acid. Examples of commercially-available products of such polyamide epoxy resin include "Sumireds Resin (Registered Trademark) 650" and "Sumireds Resin 675" (each manufactured by Sumika Chemtex Company, Limited), "WS-525" (manufactured by Japan PMC Corporation), and the like. In a case where the epoxy resin is added, an amount of the epoxy resin to be added is normally 1 part by mass to 100 parts by mass, and preferably 1 part by mass to 50 parts by mass, relative to 100 parts by mass of the polyvinyl alcohol resin.

A thickness of an adhesive agent layer formed from the dry hardening adhesive agent is normally 0.001 μm to 5 μm, preferably 0.01 μm to 2 μm, and more preferably not more than 1 μm. In a case where the adhesive agent layer formed from the dry hardening adhesive agent is excessively thick, appearance of the optically anisotropic layer is more likely to become defective.

[Active Energy Ray Curing Adhesive Agent]

The active energy ray curing adhesive agent can contain a solvent. The active energy ray curing adhesive agent indicates an adhesive agent which is hardened in response to active energy ray irradiation.

Examples of the active energy ray curing adhesive agent include a cation polymerizable adhesive agent containing an epoxy compound and a cation polymerization initiator; a radical polymerizable adhesive agent containing an acrylic curing component and a radical polymerization initiator; an adhesive agent which contains (i) a cation polymerizable curing component such as an epoxy compound, (ii) a radical polymerizable curing component such as an acrylic compound, a cation polymerization initiator, and (iv) a radical polymerization initiator; an adhesive agent which does not contain those polymerization initiators and is hardened in response to electron beam irradiation; and the like. The active energy ray curing adhesive agent is preferably a radical polymerizable active energy ray curing adhesive agent which contains an acrylic curing component and a radical polymerization initiator. Alternatively, it is preferable to employ a cation polymerizable active energy ray curing adhesive agent which contains an epoxy compound and a cation polymerization initiator and can be used with substantially no solvent.

Examples of the epoxy compound include a glycidyl etherified product of an aromatic compound or a chain compound having a hydroxyl group; a glycidyl aminated product of a compound having an amino group; an epoxide of a chain compound having a C=C double bond; an alicyclic epoxy compound in which (i) a glycidyloxy group or an epoxyethyl group is bonded to a saturated carbocyclic ring directly or via alkylene or (ii) an epoxy group is directly bonded to a saturated carbocyclic ring; and the like. These epoxy compounds can be used in only one kind or in combination of two or more kinds. Among these epoxy compounds, the alicyclic epoxy compound is preferable because of its excellent cation polymerizability.

Examples of commercially-available products of the epoxy compound include "jER" Series (manufactured by Mitsubishi Chemical Corporation), "EPICLON" (manufactured by DIC Corporation), "Epototo" (Registered Trademark) (manufactured by TOHTO Chemical Industry Co., Ltd.), "ADEKA RESIN" (Registered Trademark) (manufactured by ADEKA CORPORATION), "Denacol" (Registered Trademark) (manufactured by Nagase ChemteX Corporation), "Dow Epoxy" (manufactured by Dow Chemical Company), "TEPIC" (Registered Trademark) (manufactured by Nissan Chemical Industries, Ltd.), and the like. Examples of the alicyclic epoxy compound include "CELLOXIDE" Series and "CYCLOMER" (each manufactured by DAICEL CORPORATION), "CYRACURE UVR" Series (manufactured by Dow Chemical Company), and the like.

The active energy ray curing adhesive agent which contains an epoxy compound can further contain a compound other than the epoxy compound. Examples of the compound other than the epoxy compound include an oxetane compound, an acrylic compound, and the like. Among these, it is preferable to use the oxetane compound in combination with the epoxy compound because the oxetane compound may increase a curing speed in cation polymerization.

Examples of the oxetane compound include "ARONE OXETANE" (Registered Trademark) Series (manufactured by TOAGOSEI CO., LTD.), "ETERNACOLL" (Registered Trademark) Series (manufactured by Ube Industries, Ltd.), and the like.

The active energy ray curing adhesive agent which contains an epoxy compound or an oxetane compound is preferably used as a solventless agent.

The cation polymerization initiator is a compound which generates a cationic species in response to active energy ray irradiation such as ultraviolet ray irradiation. Examples of the cation polymerization initiator include aromatic diazonium salt; onium salts such as aromatic iodonium salt and aromatic sulfonium salt; and an iron-arene complex. These cation polymerization initiators can be used in only one kind or in combination of two or more kinds.

Examples of commercially-available products of the cation polymerization initiator include "KAYARAD" (Registered Trademark) Series (manufactured by Nippon Kayaku Co., Ltd.), "CYRACURE UVI" Series (manufactured by Dow Chemical Company), "CPI" Series (manufactured by San-Apro Ltd.), "TAZ", "BBI", and "DTS" (each manufactured by Midori Kagaku Co., Ltd.), "ADEKA OPTOMER" Series (manufactured by ADEKA CORPORATION), "Rhodorsil" (Registered Trademark) (manufactured by Rhodia Inc.), and the like.

The cation polymerization initiator is contained in an amount normally of 0.5 parts by mass to 20 parts by mass, and preferably of 1 part by mass to 15 parts by mass, relative to 100 parts by mass of the active energy ray curing adhesive agent.

Examples of the acrylic curing component include (meth)acrylate and (meth)acrylic acid such as methyl (meth)acrylate, hydroxyethyl (meth)acrylate, and the like.

Examples of the radical polymerization initiator include a hydrogen abstraction type photo-radical generator, a cleavage type photo-radical generator, and the like.

Examples of the hydrogen abstraction type photo-radical generator include a naphthalene derivative such as 1-methylnaphthalene; an anthracene derivative; a pyrene derivative; a carbazole derivative; a benzophenone derivative; a thioxanthone derivative; a coumarin derivative; and the like.

Examples of the cleavage type photo-radical generator include a benzoin ether derivative; arylalkyl ketones such as an acetophenone derivative; oxime ketones; acylphosphine oxides; thiobenzoic acid S-phenyls; titanocenes; high molecular weight derivatives of those; and the like.

Among the cleavage type photo-radical generators, the acylphosphine oxides are preferable. Specifically, it is preferable to use trimethylbenzoyl diphenylphosphine oxide (product name "DAROCURE TPO"; manufactured by BASF Japan Ltd.), bis(2,6-dimethoxy-benzoyl)-(2,4,4-trimethyl-pentyl)-phosphine oxide (product name "CGI 403"; manufactured by BASF Japan Ltd.), or bis(2,4,6-trimethyl-benzoyl)-2,4-dipentoxyphenylphosphine oxide (product name "Irgacure 819"; manufactured by BASF Japan Ltd.).

The active energy ray curing adhesive agent can contain a sensitizer. The sensitizer is contained in an amount preferably of 0.1 parts by mass to 20 parts by mass, relative to 100 parts by mass of the active energy ray curing adhesive agent.

The active energy ray curing adhesive agent can further contain an ion trapping agent, an antioxidant, a chain transfer agent, a tackifier, thermoplastic resin, filler, a fluidity adjusting agent, a plasticizer, an anti-foaming agent, and the like.

In this specification, an active energy ray is defined as an energy ray which can generate an activated species by decomposing a compound which generates an activated species. Examples of such an active energy ray include visible light, an ultraviolet ray, an infrared ray, an X-ray, an α-ray, a β-ray, a γ-ray, an electron ray, and the like. It is preferable to employ an ultraviolet ray or an electron ray.

An acceleration voltage for electron ray irradiation is normally 5 kV to 300 kV, and preferably 10 kV to 250 kV. An exposure dose is normally 5 kGy to 100 kGy, and preferably 10 kGy to 75 kGy. The electron ray irradiation is normally carried out in an inert gas. Alternatively, the electron ray irradiation can be carried out in air or in an inert gas to which oxygen has been slightly introduced.

An ultraviolet irradiation intensity is normally 10 mW/cm$^2$ to 3,000 mW/cm$^2$. The ultraviolet irradiation intensity is preferably in a wavelength region which is effective for activation of the cation polymerization initiator or the radical polymerization initiator. In a case where irradiation is carried out once or a plurality of times at such an ultraviolet irradiation intensity, an accumulated light intensity thereof becomes 10 mJ/cm$^2$ to 3,000 mJ/cm$^2$, preferably 50 mJ/cm$^2$ to 2,000 mJ/cm$^2$, and more preferably 100 mJ/cm$^2$ to 1,000 mJ/cm$^2$. In a case where the accumulated light intensity is less than the above range, the polymerizable liquid crystal compound may be insufficiently hardened, and therefore a good transferring property may not be achieved. Meanwhile, in a case where the accumulated light intensity is more than the above range, an optical film including the optically anisotropic layer may be colored.

Examples of a light source of an ultraviolet ray include a low pressure mercury lamp, a medium pressure mercury lamp, a high pressure mercury lamp, an ultra-high pressure mercury lamp, a xenon lamp, a halogen lamp, a carbon arc lamp, a tungsten lamp, a gallium lamp, an excimer laser, an LED light source which emits light having a wavelength of 380 nm to 440 nm, a chemical lamp, a black light lamp, a microwave excitation mercury lamp, a metal halide lamp, and the like.

Examples of the solvent include water; alcohols such as methanol, ethanol, isopropyl alcohol, 1-butanol, 2-butanol, sec-butyl alcohol, tert-butyl alcohol, ethylene glycol, propylene glycol, and butanediol; saturated aliphatic ether compounds such as propyl ether, isopropyl ether, butyl ether, isobutyl ether, n-amyl ether, isoamyl ether, methyl butyl ether, methyl isobutyl ether, methyl n-amyl ether, methyl isoamyl ether, ethyl propyl ether, ethyl isopropyl ether, ethyl butyl ether, ethyl isobutyl ether, ethyl n-amyl ether, and ethyl isoamyl ether; unsaturated aliphatic ether compounds such as allyl ether and ethyl allyl ether; aromatic ether compounds such as anisole, phenetole, phenyl ether, and benzyl ether; cyclic ether compounds such as tetrahydrofuran, tetrahydropyran, and dioxane; ethylene glycol ether compounds such as ethylene glycol monomethyl ether, ethylene glycol monoethyl ether, ethylene glycol monobutyl ether, diethylene glycol monomethyl ether, diethylene glycol monoethyl ether, and diethylene glycol monobutyl ether; monocarboxylic acid compounds such as formic acid, acetic acid, acetic anhydride, acrylic acid, citric acid, propionic acid, and butyric acid; organic acid ester compounds such as butyl formate, amyl formate, propyl acetate, isopropyl acetate, butyl acetate, secondary butyl acetate, amyl acetate, isoamyl acetate, 2-ethylhexyl acetate, cyclohexyl acetate, butyl cyclohexyl acetate, ethyl propionate, butyl propionate, amyl propionate, butyl butyrate, diethyl carbonate, diethyl oxalate, methyl lactate, ethyl lactate, butyl lactate, and triethyl phosphate; ketone compounds such as acetone, ethyl ketone, propyl ketone, butyl ketone, methyl isopropyl ketone, methyl isobutyl ketone, diisobutyl ketone, acetylacetone, diacetone alcohol, cyclohexanone, cyclopentanone, methylcyclohexanone, cycloheptanone; dicarboxylic acid compounds such as succinic acid, glutaric acid, adipic acid, undecanedioic acid, pyruvic acid, and citraconic acid; 1,4-dioxane; furfural; N-methylpyrrolidone; and the like.

Among those solvents, it is preferable to employ water and alcohol, it is still more preferable to employ C1-C4 alcohol, it is further preferable to employ at least one alcohol selected from the group consisting of methanol, ethanol, isopropyl alcohol, 1-butanol, 2-butanol, sec-butyl alcohol, tert-butyl alcohol, ethylene glycol, propylene glycol, and butanediol, and it is particularly preferable to employ isopropyl alcohol and/or 1-butanol.

The water can be pure water or can contain impurities to an extent equivalent to an extent to which tap water contains impurities.

A thickness of an adhesive agent layer formed from the active energy ray curing adhesive agent is normally 0.001 μm to 5 μm, preferably not less than 0.01 μm, and preferably not more than 2 μm, and more preferably not more than 1 μm. In a case where the adhesive agent layer formed from the active energy ray curing adhesive agent is excessively thick, appearance of the optically anisotropic layer is more likely to become defective.

[Method for Producing Laminated Body]

A method for producing a laminated body of the present invention can be a method in which an alignment film is formed on a base material, an optically anisotropic layer is formed on the alignment film, the base material is peeled and removed, and then an adhesive agent layer is laminated on a surface of the alignment film from which surface the base material has been removed. In this case, it is preferable to form the optically anisotropic layer by (i) applying a composition for optically anisotropic layer formation which composition contains an oxime photopolymerization initiator and a polymerizable liquid crystal compound to the alignment film and (ii) polymerizing the polymerizable liquid crystal compound by light irradiation, because the base material can be removed while preventing the optically anisotropic layer from being peeled off from the alignment film. Alternatively, it is preferable to form the optically anisotropic layer by (i) applying a composition for optically anisotropic layer formation which composition contains an adherence improver and a polymerizable liquid crystal compound to the alignment film and (ii) polymerizing the polymerizable liquid crystal compound by light irradiation, because the base material can be removed while preventing the optically anisotropic layer from being peeled off from the alignment film.

In a case of a base material whose surface has a functional group that is to form a chemical bond with an alignment film, the functional group forms a chemical bond with the alignment film, and therefore the base material tends to become difficult to remove. From this, in a case where the base material is to be peeled and removed, it is preferable to employ a base material whose surface has a small number of functional groups or it is preferable to employ a base material which has not been subjected to surface treatment for forming a functional group on a surface of the base material.

An alignment film which has a functional group by which a chemical bond is formed with a base material tends to cause greater adhesion between the base material and the alignment film. Therefore, in a case where the base material is to be peeled and removed, it is preferable to employ an alignment film which has a small number of functional groups by which a chemical bond is formed with the base material. A solution of the alignment polymer composition, the composition for photoalignment film formation, or the like preferably contains no reagent for cross-linking the base material with the alignment film, and preferably contains no component such as a solvent which dissolves the base material.

An alignment film which has a functional group by which a chemical bond is formed with an optically anisotropic layer tends to cause greater adhesion between the optically anisotropic layer and the alignment film. Therefore, it is preferable to employ an optically anisotropic layer which has a large number of functional groups by which a chemical bond is formed with the alignment film, and a composition for optically anisotropic layer formation preferably contains a reagent for cross-linking the alignment film with the optically anisotropic layer.

In general, in a case where the optically anisotropic layer is formed, a composition for optically anisotropic layer formation which composition contains a polymerizable liquid crystal compound is laminated on a base material, the polymerizable liquid crystal compound is irradiated with ultraviolet light (UV) from a polymerizable liquid crystal compound side, and thus the polymerizable liquid crystal compound is polymerized. From this, a degree of polymerization of a polymer obtained from the polymerizable liquid crystal compound in the vicinity of an interface between the optically anisotropic layer and the alignment film tends to become low. Subsequently, an adhesive agent layer is laminated on the optically anisotropic layer, and a part of the polymerizable liquid crystal compound which has not been reacted is melted and diffused in the adhesive agent layer by heat, and the optically anisotropic layer becomes isotropic. This causes a decrease in optical characteristic of the laminated body. In particular, in a case where each of the adhesive agent layer and the optically anisotropic layer contains a polymer having a structural unit derived from an acrylic acid compound or a methacrylic acid compound, compatibility of the polymer contained in each of the adhesive agent layer and the optically anisotropic layer is high, and therefore a surface of the optically anisotropic layer is easily corroded and a part of the polymerizable liquid crystal compound which has not been reacted is easily melted and diffused in the adhesive agent layer. From this, an optical characteristic of the laminated body easily decreases. With the configuration in which the laminated body includes the alignment film, it is possible to inhibit the decrease in optical characteristic. As such, in the laminated body of the present invention, it is preferable that the adhesive agent layer contains a polymer having a structural unit derived from an acrylic acid compound or a methacrylic acid compound and the optically anisotropic layer contains a polymer obtained from a polymerizable liquid crystal compound having an acryloyl group or a methacryloyl group, in view of inhibiting a decrease in optical characteristic, which decrease is normally difficult to inhibit.

A method for applying a composition for optically anisotropic layer formation to a surface of the alignment film which has been formed on the base material can be a method identical with the method exemplified as the method for applying the alignment polymer composition to the base material. A thickness of the composition to be applied is determined by taking into consideration a thickness of an optically anisotropic layer to be obtained.

Next, the solvent contained in the composition is removed under a condition in which the polymerizable liquid crystal compound is not polymerized, and thus a dry film of the composition for optically anisotropic layer formation is formed on the surface of the alignment film. Examples of a method for removing the solvent include natural drying, draught drying, drying by heating, drying under reduced pressure, and the like.

The dry film is heated or the like so as to subject the polymerizable liquid crystal compound contained in the dry film to liquid crystal alignment, then the dry film is irradiated with energy while maintaining the liquid crystal alignment, and thus the polymerizable liquid crystal compound is polymerized. The composition contains the photopolymerization initiator, and it is therefore preferable to irradiate the dry film with energy under a condition in which the photopolymerization initiator is activated. Light with which the dry film is irradiated is appropriately selected depending (i) on a kind of the photopolymerization initiator contained in the dry film or on a kind of the polymerizable liquid crystal compound (in particular, a kind of a polymerizable group contained in the polymerizable liquid crystal compound) and (ii) on an amount of the photopolymerization initiator or of the polymerizable liquid crystal compound. Examples of the light include light selected from the group consisting of visible light, ultraviolet light, and laser light, an active electron ray, and the like. Among these, the ultraviolet light is preferable because it is easy to control progress of a polymerization reaction and it is possible to employ light emitted from a device which is widely used in this field for polymerization. Therefore, it is preferable to select a kind of the polymerizable liquid crystal compound and a kind of the photopolymerization initiator, which are to be contained in the composition, so that polymerization can be carried out with ultraviolet light. In the polymerization, it is preferable to control a polymerization temperature by cooling the dry film with appropriate cooling means while irradiating the dry film with ultraviolet light. By carrying out polymerization of the polymerizable liquid crystal compound at a lower temperature with use of such cooling means, it is possible to appropriately produce the optically anisotropic layer even if a material which has low heat resistance is used as the base material.

As such, the optically anisotropic layer having the liquid crystal alignment is formed on the surface of the base material or the surface of the alignment film.

Embodiment 2

Circularly Polarizing Plate

The present invention can be a circularly polarizing plate which includes the laminated body of Embodiment 1. The circularly polarizing plate can have a structure in which a polarizer or a polarizing plate, a second adhesive agent layer, an optically anisotropic layer, an alignment film, and a first adhesive agent layer are laminated in this order. Here, the first adhesive agent layer is the adhesive agent layer included in the laminated body of Embodiment 1 of the present invention, and the second adhesive agent layer is an adhesive agent layer which is formed on the optically anisotropic layer.

[Method for Producing Circularly Polarizing Plate]

In an example of a method for producing a circularly polarizing plate, first, an alignment film is formed on a surface of a base material, an optically anisotropic layer is formed on the alignment film, and thus a film is prepared which includes the base material, the alignment film, and the optically anisotropic layer in this order. Next, a second adhesive agent layer is formed on the optically anisotropic layer in the film, and the film is bonded to a polarizer or a polarizing plate (serving as a transfer receiving body) via the second adhesive agent layer. Subsequently, a first adhesive agent layer is formed on a surface of the alignment film which has appeared by removing only the base material from the film. Here, it is possible to employ a configuration in which the second adhesive agent layer is formed on the polarizer or the polarizing plate instead of on the optically anisotropic layer and the optically anisotropic layer in the film is bonded to the second adhesive agent layer. Moreover, the optically anisotropic layer can be a film which has been obtained by being hardened in a state where a polymerizable liquid crystal compound is oriented in a parallel direction with respect to a surface of the base material.

<Transfer Receiving Body>

A transfer receiving body used to prepare the circularly polarizing plate of the present invention is a polarizer or a polarizing plate. Note that, in a case where a product different from the circularly polarizing plate is prepared (e.g., in a case where the film is directly bonded to a display), a transfer receiving body different from the polarizer or the polarizing plate can be used (e.g., a display, a transfer receiving body made of a material identical with that of the base material, or the like can be used).

[Polarizer and Polarizing Plate]

The polarizer has a polarizing function. Examples of the polarizer include a stretched film which has been caused to adsorb a pigment having absorption anisotropy; a film to which a pigment having absorption anisotropy has been applied; and the like. The pigment having absorption anisotropy can be a dichroic pigment.

The stretched film which has adsorbed a pigment having absorption anisotropy is normally produced through the steps of (i) uniaxially stretching a polyvinyl alcohol resin film, (ii) causing the polyvinyl alcohol resin film to adsorb a dichroic pigment by dyeing the polyvinyl alcohol resin film with the dichroic pigment, (iii) treating, with a boric acid aqueous solution, the polyvinyl alcohol resin film which has adsorbed the dichroic pigment, and (iv) washing the polyvinyl alcohol resin film with water after the polyvinyl alcohol resin film has been treated with the boric acid aqueous solution.

The dichroic pigment can be iodine or a dichroic organic dye. Examples of the dichroic organic dye include a dichroic direct dye which is made of a disazo compound such as C.I. DIRECT RED 39; a dichroic direct dye made of a compound such as a trisazo compound or a tetrakisazo compound; and the like.

The polarizer which has been obtained as above described, i.e., by subjecting the polyvinyl alcohol resin film to uniaxial stretching, dyeing with the dichroic pigment, boric acid treatment, washing with water, and drying has a thickness preferably of 5 μm to 40 μm.

Examples of the film to which a pigment having absorption anisotropy has been applied include a film which has been obtained by applying a composition that contains a dichroic pigment having liquid crystallinity; a film which has been obtained by applying a composition that contains a dichroic pigment and a polymerizable liquid crystal compound; and the like.

The film to which a pigment having absorption anisotropy has been applied is preferably thin. Note, however, that, in a case where the film to which a pigment having absorption anisotropy has been applied is excessively thin, strength of the film tends to decrease and processability of the film tends to be deteriorated. A thickness of the film is normally not more than 20 μm, preferably not more than 5 μm, and more preferably 0.5 μm to 3 μm.

The film to which a pigment having absorption anisotropy has been applied can specifically be a film disclosed in Japanese Patent Application Publication, Tokukai, No. 2012-33249 or the like.

From the viewpoint of the foregoing reduction in thickness, the polarizer is preferably the film to which a pigment having absorption anisotropy has been applied.

The polarizing plate can be obtained by laminating a transparent protective film on at least one surface of the polarizer via an adhesive agent. The transparent protective film is preferably a transparent film which is similar to the foregoing base material.

[Second Adhesive Agent Layer]

The second adhesive agent layer can be formed from an adhesive agent which is similar to that of the first adhesive agent layer, i.e., the adhesive agent layer in the laminated body of Embodiment 1 of the present invention.

Embodiment 3

Display Device

The present invention encompasses a display device which includes the laminated body of Embodiment 1. The display device can be, for example, any of various display devices such as an organic EL display device, a touch panel display device, and the like. Moreover, the display device can include the circularly polarizing plate of Embodiment 2.

The display device is a device including: a display element; and a light emitting element or a light emitting device serving as a light emitting source. Examples of the display device include a liquid crystal display device, an organic electroluminescent (EL) display device, an inorganic electroluminescent (EL) display device, a touch panel display device, an electron emission display device (a field emission display device (e.g., FED), a surface-conduction electron-emitter display device (SED)), electronic paper (a display device which employs electronic ink or an electrophoretic element), a plasma display device, projection display devices (e.g., a grating light valve (GLV) display device and a display device including a digital micromirror device (DMD)), a piezoelectric ceramic display, and the like. The liquid crystal display device includes all the following display devices: a transmissive liquid crystal display device, a semi-transmissive liquid crystal display device, a reflective liquid crystal display device, a direct-view liquid crystal display device, a projection liquid crystal display device, and the like. Each of those display devices can be a display device which displays a two-dimensional image or can be a stereoscopic display device which displays a three-dimensional image. Particularly, a display device which is provided with a circularly polarizing plate including the laminated body is preferably the organic EL display device or the inorganic EL display device. Moreover, a display device which is provided with an optical compensation polarizing plate including the laminated body is preferably the liquid crystal display device or the touch panel display device.

EXAMPLES

The present invention will be described below in more detail with reference to Examples, and Comparative Examples, and Reference Example. Note that "%" and "part(s)" in Examples and Comparative Examples mean "mass %" and "part(s) by mass," respectively, if not otherwise specified.

Polymer films, devices, and measurement methods used in Examples 1 through 7, Comparative Examples 1 through 3, and Reference Example were as follows.

ZF-14, manufactured by Zeon Corporation, was used as a cycloolefin polymer (COP) film.

AGF-B10, manufactured by Kasuga Electric Works Ltd., was used as a corona treatment device.

Corona treatment was carried out once with use of the above corona treatment device under conditions of (i) output of 0.3 kW and (ii) a treatment speed of 3 m/min.

SPOT CURE SP-7 equipped with a polarizer unit, manufactured by Ushio Inc., was used as a polarized UV light irradiation device.

LEXT, manufactured by Olympus Corporation, was used as a laser microscope.

Unicure VB-15201BY-A, manufactured by Ushio Inc., was used as a high pressure mercury lamp.

KOBRA-WR, manufactured by Oji Scientific Instruments Co., Ltd., was used to measure an in-plane phase difference value.

An ellipsometer M-220, manufactured by JASCO Corporation, was used to measure a thickness of a film.

Model 670-IR, manufactured by Agilent Technologies, was used to measure an infrared total reflection absorption spectrum.

For productions of an optically anisotropic layer, a laminated body, and the like, a "composition for photoalignment film formation", a "rubbing alignment polymer composition", a "composition containing the polymerizable liquid crystal compound", a "polarizing plate", and an "adhesive agent composition" which are described below were used.

[Preparation of Composition for Photoalignment Film Formation]

Five parts of a photoalignment material having the following structure, and 95 parts of cyclopentanone (solvent) were mixed together as components. A resultant mixture was stirred at 80° C. for 1 (one) hour to obtain a composition for photoalignment film formation. The photoalignment material was synthesized in accordance with a method described in Japanese Patent Application Publication, Tokukai, No. 2013-33248.

[Chem. 5]

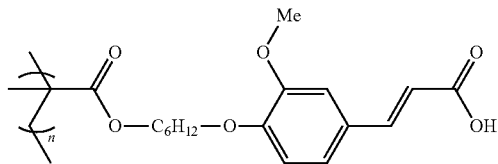

[Preparation of Rubbing Alignment Polymer Composition]

Two parts of commercially-available polyvinyl alcohol (polyvinyl alcohol 1000; completely saponified type; manufactured by Wako Pure Chemical Industries, Ltd.) was added to 100 parts of water, and then a resultant mixture was heated at 100° C. for 1 (one) hour. Thus, a rubbing alignment polymer composition was obtained.

[Preparation of Composition Containing Polymerizable Liquid Crystal Compound]

A polymerizable liquid crystal compound A having the following structure, a polyacrylate compound (leveling agent) (BYK-361N; manufactured by BYK Chemie), and a polymerization initiator below were mixed together as components to obtain a composition containing a polymerizable liquid crystal compound.

[Chem. 6]

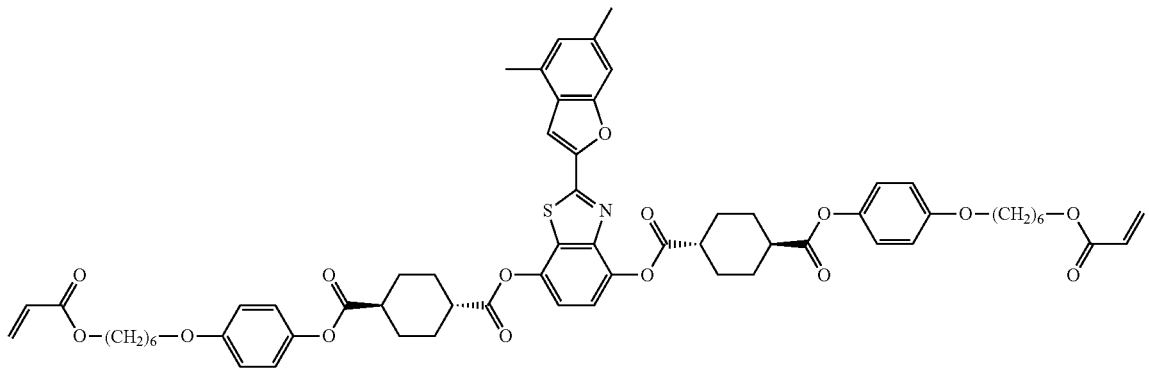

The polymerizable liquid crystal compound A was synthesized by a method disclosed in Japanese Patent Application Publication, Tokukai, No. 2010-31223. A wavelength $\lambda_{max}$(LC) at which the polymerizable liquid crystal compound A had a maximum absorption was 350 nm.

An amount of the polyacrylate compound was 0.01 parts, relative to 100 parts of the polymerizable liquid crystal compound A.

The polymerization initiator was selected from the following three kinds of polymerization initiators. In each of Examples, Comparative Examples, and Reference Example, the polymerization initiator shown in the following Table 1 was added in an amount shown in Table 1 with respect to 100 parts of the polymerizable liquid crystal compound A.

Irgacure OXE-03 (manufactured by BASF Japan Ltd.)
ADEKA ARKLS NCI-831 (manufactured by ADEKA CORPORATION)
2-dimethylamino-2-benzil-1-(4-morpholinophenyl) butane-1-one (Irgacure 369 (Irg369); manufactured by BASF Japan Ltd.)

Moreover, in Example 6, Laromer (Registered Trademark) LR-9000 (manufactured by BASF Japan Ltd.) was used as an adherence improver.

[Production of Polarizing Plate]

A polyvinyl alcohol film having a thickness of 75 µm, an average degree of polymerization of approximately 2,400, and a degree of saponification of 99.9 mol % or higher was immersed in pure water at 30° C., and then the polyvinyl alcohol film was immersed in an aqueous solution which contained iodine/potassium iodide/water at a weight ratio of 0.02/2/100 and was at a temperature of 30° C. Thus, the polyvinyl alcohol film was subjected to iodine stain (iodine stain step). The polyvinyl alcohol film which had been subjected to the iodine stain step was then immersed in an aqueous solution which contained potassium iodide/boric acid/water at a weight ratio of 12/5/100 and was at a temperature of 56.5° C., and thus the polyvinyl alcohol film was subjected to boric acid treatment (boric acid treatment step). The polyvinyl alcohol film which had been subjected to the boric acid treatment step was washed with pure water at 8° C. and then dried at 65° C. Thus, a polarizer (having a thickness of 27 µm after stretching) was obtained in which iodine was adsorbed on polyvinyl alcohol while being aligned. In this case, the polyvinyl alcohol film was stretched in the iodine stain step and the boric acid treatment step. A total stretch magnification in the stretching was 5.3 times.

The polarizer thus obtained was (i) sandwiched between two triacetylcellulose films (manufactured by KONICA MINOLTA JAPAN, INC.; KC4UY TAC: 40 µm) which had been subjected to saponification treatment and (ii) bonded to the triacetylcellulose films via a water-based adhesive agent with use of nip rollers. While a tension of a laminated film thus obtained was kept at 430 N/m, the laminated film was dried at 60° C. for 2 minutes, and thus a polarizing plate (1) having triacetylcellulose films (i.e., protective films) on both surfaces thereof was obtained. Note that the water-based adhesive agent was prepared by adding 3 parts of carboxyl group modified polyvinyl alcohol (manufactured by KURARAY CO., LTD.; KURARAY POVAL KL318) and 1.5 parts of water-soluble polyamide epoxy resin (manufactured by Sumika Chemtex Company, Limited; Sumireds Resin 650; aqueous solution having solid content concentration of 30%) to 100 parts of water.

[Production of Adhesive Agent Composition]

By mixing components below, an ultraviolet curable adhesive agent composition was prepared.

3,4-epoxycyclohexylmethyl-3,4-epoxycyclohexanecarboxylate: 40 parts
Diglycidyl ether of bisphenol A: 60 parts
Diphenyl(4-phenylthiophenyl)sulfonium hexafluoroantimonate (photo-cation polymerization initiator): 4 parts Example 1

Production of Optically Anisotropic Layer 1

N-methyl-2-pyrolidone (NMP) was added, as a solvent, to a composition containing a polymerizable liquid crystal compound shown in Table 1 below so that a solid content concentration became 13%, and a resultant mixture was stirred at 80° C. for 1 (one) hour. Thus, a coating liquid was obtained.

A cycloolefin polymer film (COP, manufactured by Zeon Corporation, ZF-14) was subjected to corona treatment once with use of a corona treatment device (AGF-B10, manufactured by Kasuga Electric Works Ltd.) under conditions of (i) output of 0.3 kW and (ii) a treatment speed of 3 m/min. A composition for photoalignment film formation was (i) applied, with a bar coater, to a surface which had been subjected to the corona treatment and (ii) dried at 80° C. for 1 (one) minute. Then, polarized UV exposure was carried out at an accumulated light intensity of 100 mJ/cm$^2$ with use of a polarized UV light irradiation device (SPOT CURE SP-7; manufactured by Ushio Inc.). A film thickness of an alignment film thus obtained was 100 nm, as a result of measurement with the ellipsometer.

Subsequently, the coating liquid which had been above prepared from the composition containing the polymerizable liquid crystal compound was applied to the alignment film with use of a bar coater and dried at 120° C. for 1 (one) minute. Then, the coating liquid was irradiated, with use of a high pressure mercury lamp (Unicure VB-15201BY-A, manufactured by Ushio Inc.), with an ultraviolet ray (in a nitrogen atmosphere, accumulated light intensity at wavelength of 313 nm: 500 mJ/cm$^2$) from a side of a surface of the alignment film on which surface the composition containing the polymerizable liquid crystal compound was applied. Thus, an optical film including an optically anisotropic layer 1 was formed.

An adhesive was applied to the optical film thus obtained, and then the optical film was bonded to a polarizing plate which had been subjected to corona treatment once with use of a corona treatment device (AGF-B10, manufactured by Kasuga Electric Works Ltd.) under conditions of (i) output of 0.3 kW and (ii) a treatment speed of 3 m/min. In this case, a circularly polarizing plate was formed by laminating the polarizing plate and the optically anisotropic layer such that an absorption axis of the polarizing plate and a slow axis of the optically anisotropic layer intersect at 45°. Then, the COP film which was the base material was peeled, and thus a circularly polarizing plate in which the optically anisotropic layer 1 had been transferred to the polarizing plate was obtained.

A film thickness of the COP film which had been peeled was measured with use of the ellipsometer M-220. As a result, no photoalignment film existed, and it was thus confirmed that the photoalignment film had been transferred to the polarizing plate. In-plane phase difference values of the circularly polarizing plate thus obtained were measured at a wavelength of 450 nm, a wavelength of 550 nm, and a wavelength of 650 nm, and the in-plane phase difference values at the respective wavelengths were as follows: that is, Re(450)=121 nm, Re(550)=139 nm, and Re(650)=142 nm, and a relationship among the in-plane phase difference values was as follows:

Re(450)/Re(550)=0.87
Re(650)/Re(550)=1.02 wherein: Re(450) represents an in-plane phase difference value with respect to light having a wavelength of 450 nm; Re(550) represents an in-plane phase difference value with respect to light having a wavelength of 550 nm; and Re(650) represents an in-plane phase difference value with respect to light having a wavelength of 650 nm.

That is, the optically anisotropic layer 1 had an optical characteristic represented by the following Formulae (1'), (3), and (4). Note that an in-plane phase difference value of the polarizing plate at a wavelength of 550 nm is approximately 0 (zero). Therefore, the in-plane phase difference value of the polarizing plate does not affect a relation of the in-plane phase difference values.

$$100 < Re(550) < 150 \quad (1')$$

$$Re(450)/Re(550) \le 1.0 \quad (3)$$

$$1.00 \le Re(650)/Re(550) \quad (4)$$

[Infrared Total Reflection Absorption Spectrum Measurement]

Infrared total reflection absorption spectrum measurement (at an incident angle of 45°) was carried out on a photoalignment film side of the circularly polarizing plate. Note that a film thickness of the photoalignment film was extremely thin, i.e., 100 nm, and therefore a measurement value obtained here reflected a state of the optically anisotropic layer which was measured via the photoalignment film. A measured peak intensity I(1) derived from in-plane deformation vibration (1408 $cm^{-1}$) of ethylenic unsaturated bond was 0.0040, a measured peak intensity I(2) derived from stretching vibration (1504 $cm^{-1}$) of unsaturated aromatic ring bond was 0.046, and thus the following was obtained: that is, "P'=I(1)/I(2)=0.087". Similarly, the polymerizable liquid crystal compound A was subjected to the infrared total reflection absorption spectrum measurement, and a calculated P0 value was 0.3226. That is, "(1−P'/P0)×100=73" was obtained, and thus the optically anisotropic layer was confirmed to fall within the range represented by Formula (Y).

[Phase Difference Value Measurement in Heat-Resistance Test]

Onto the photoalignment film side of the circularly polarizing plate, an adhesive (which contained an acrylic polymer) and a glass base material were further provided in this order. A laminated body thus obtained was put in an oven at 85° C. and, 500 hours later, an in-plane phase difference value was measured. As such, a changed amount of the in-plane phase difference value between before and after the heat-resistance test was calculated.

Example 2

A circularly polarizing plate including the optically anisotropic layer 1 was prepared in a manner similar to that of Example 1, except that a film thickness of a photoalignment film was adjusted to 300 nm by changing a thickness of a wire bar when a composition for photoalignment film formation was applied by a bar coater. In this case, a surface from which a COP film had been peeled by transferring was measured with the ellipsometer, and no alignment film was observed. Further, an in-plane phase difference value and an amount of change in in-plane phase difference value between before and after a heat-resistance test were measured in a manner similar to that of Example 1.

Example 3

A circularly polarizing plate including the optically anisotropic layer 1 was prepared in a manner similar to that of Example 1, except that an adhesive agent composition was dropped with a dropper between an optical film which had been obtained in a manner similar to that of Example 1 and a polarizing plate, then the optical film and the polarizing plate were bonded to each other via the adhesive agent composition by pressure with use of a roll laminator, and the optical film and the polarizing plate were then fixed by being irradiated with an ultraviolet ray on a COP film side with use of the high pressure mercury lamp (Unicure VB-15201BY-A, manufactured by Ushio Inc.) (in a nitrogen atmosphere, accumulated light intensity at wavelength of 313 nm: 500 $mJ/cm^2$). In this case, a surface from which a COP film had been peeled by transferring was measured with the ellipsometer, and no alignment film was observed. Further, an in-plane phase difference value and an amount of change in in-plane phase difference value between before and after a heat-resistance test were measured in a manner similar to that of Example 1.

Examples 4 through 6

Circularly polarizing plates including respective optically anisotropic layers 2 through 4 were prepared in a manner similar to that of Example 1, except that the composition containing the polymerizable liquid crystal compound was changed to compositions shown in Table 1 below. In this case, a surface from which a COP film had been peeled by transferring was measured with the ellipsometer, and no alignment film was observed. Further, an in-plane phase difference value and an amount of change in in-plane phase difference value between before and after a heat-resistance test were measured in a manner similar to that of Example 1.

Example 7

A circularly polarizing plate including an optically anisotropic layer 5 was prepared in a manner similar to that of Example 1, except that the accumulated light intensity of the high pressure mercury lamp at a wavelength of 313 nm was changed from 500 $mJ/cm^2$ to 300 $mJ/cm^2$. In this case, a surface from which a COP film had been peeled by transferring was measured with the ellipsometer, and no alignment film was observed. Further, an in-plane phase difference value and an amount of change in in-plane phase difference value between before and after a heat-resistance test were measured in a manner similar to that of Example 1.

Comparative Example 1

A circularly polarizing plate including an optically anisotropic layer 7 was prepared in a manner similar to that of Example 1, except that the composition containing the polymerizable liquid crystal compound was changed to a composition shown in Table 1 below. In this case, a surface from which a COP film had been peeled by transferring was measured with the ellipsometer, and an alignment film having a thickness of 100 nm was confirmed. Further, an in-plane phase difference value and an amount of change in in-plane phase difference value between before and after a heat-resistance test were measured in a manner similar to that of Example 1.

Comparative Example 2

A circularly polarizing plate including the optically anisotropic layer 7 was prepared in a manner similar to that of Example 3, except that the composition containing the polymerizable liquid crystal compound was changed to a composition shown in Table 1 below. In this case, a surface from which a COP film had been peeled by transferring was measured with the ellipsometer, and an alignment film having a thickness of 100 nm was confirmed. Further, an in-plane phase difference value and an amount of change in in-plane phase difference value between before and after a heat-resistance test were measured in a manner similar to that of Example 1.

Comparative Example 3

A circularly polarizing plate including the optically anisotropic layer 1 was prepared in a manner similar to that of Example 1, except that an alignment film was formed by applying a rubbing alignment polymer composition and carrying out rubbing treatment after drying by heating at 80° C. for 1 (one) minute, instead of applying the composition for photoalignment film formation with a bar coater, drying at 80° C. for 1 (one) minute, and carrying out polarized UV exposure at an accumulated light intensity of 100 mJ/cm$^2$ with use of the polarized UV light irradiation device (SPOT CURE SP-7; manufactured by Ushio Inc.) In this case, a surface from which a COP film had been peeled by transferring was measured with the ellipsometer, and an alignment film having a thickness of 100 nm was confirmed. Further, an in-plane phase difference value and an amount of change in in-plane phase difference value between before and after a heat-resistance test were measured in a manner similar to that of Example 1.

Comparative Example 4

A circularly polarizing plate including an optically anisotropic layer 8 was prepared in a manner similar to that of Example 1, except that the polymerizable liquid crystal compound was changed to a composition shown in Table 1 below and the accumulated light intensity of the high pressure mercury lamp at a wavelength of 313 nm was changed from 500 mJ/cm$^2$ to 100 mJ/cm$^2$. In this case, a surface from which a COP film had been peeled by transferring was measured with the ellipsometer, and no alignment film was observed. Further, an in-plane phase difference value and an amount of change in in-plane phase difference value between before and after a heat-resistance test were measured in a manner similar to that of Example 1.

Comparative Example 5

A circularly polarizing plate including an optically anisotropic layer 9 was prepared in a manner similar to that of Example 1, except that the composition containing the polymerizable liquid crystal compound was changed to a composition shown in Table 1 below. In this case, a surface from which a COP film had been peeled by transferring was measured with the ellipsometer, and no alignment film was observed. Further, an in-plane phase difference value and an amount of change in in-plane phase difference value between before and after a heat-resistance test were measured in a manner similar to that of Example 1.

Reference Example

An optically anisotropic layer 6 was prepared in a manner similar to that of Example 1, except that the accumulated light intensity in ultraviolet irradiation at a wavelength of 313 nm was changed from 500 mJ/cm$^2$ to 5000 mJ/cm$^2$, and further a circularly polarizing plate including the optically anisotropic layer 6 was prepared. In this case, a surface from which a COP film had been peeled by transferring was measured with the ellipsometer, and an alignment film having a thickness of 100 nm was confirmed. Further, an in-plane phase difference value and an amount of change in in-plane phase difference value between before and after a heat-resistance test were measured in a manner similar to that of Example 1.

Phase difference values of the circularly polarizing plate thus obtained were measured at a wavelength of 450 nm, a wavelength of 550 nm, and a wavelength of 650 nm, and the phase difference values at the respective wavelengths were as follows: that is, Re(450)=126 nm, Re(550)=139 nm, Re(650)=141 nm, and Re(450)/Re(550)=0.91. This value was larger than that of Example 1, and indicated that the wavelength dispersion property was inferior. Note that, as early described, in a case where a value of "Re(450)/Re (550)" is more than 0.9, such a circularly polarizing plate causes blue light and red light to excessively pass through and is therefore not suitable for practical use.

Table 1 below shows configurations of the circularly polarizing plates respectively produced in Examples 1 through 7, Comparative Examples 1 through 5, and Reference Example, results of infrared total reflection absorption spectrum measurement on the circularly polarizing plates, and the like.

TABLE 1

|  |  | Alignment film | Exposure energy (mJ/cm2) | Initiator add amount (part by mass) | | | Adherence improver | P' | (1 − P'/P0) × 100 | Alignment film | M.A. wavelength of O.A. layer |
|---|---|---|---|---|---|---|---|---|---|---|---|
|  |  |  |  | OXE-03 | NCI-831 | Irg369 |  |  |  |  |  |
| Examples 1-3 | O.A. layer 1 | Photoalignment film | 500 | 7.5 |  |  | 0 | 0.087 | 73 | Exist | 350 nm |
| Example 4 | O.A. layer 2 | Photoalignment film | 500 | 5 |  |  | 0 | 0.102 | 68 | Exist | 350 nm |
| Example 5 | O.A. layer 3 | Photoalignment film | 500 |  | 5 |  | 0 | 0.092 | 71 | Exist | 350 nm |
| Example 6 | O.A. layer 4 | Photoalignment film | 500 |  |  | 6 | 3 | 0.094 | 71 | Exist | 350 nm |
| Example 7 | O.A. layer 5 | Photoalignment film | 300 | 7.5 |  |  | 0 | 0.114 | 85 | Exist | 350 nm |
| Ref. Ex. | O.A. layer 6 | Photoalignment film | 5000 | 7.5 |  |  | 0 | 0.046 | 86 | Exist | 350 nm |
| Com. Ex. 1-2 | O.A. layer 7 | Photoalignment film | 500 |  |  | 6 | 0 | 0.094 | 71 | None | 350 nm |
| Com. Ex. 3 | O.A. layer 1 | Rubbing alignment film | 500 | 7.5 |  |  | 0 | 0.085 | 74 | None | 350 nm |

TABLE 1-continued

|  | Alignment film | | Exposure energy (mJ/cm2) | Initiator add amount (part by mass) | | | Adher-ence improver | P' | $(1 - P'/P0) \times 100$ | Align-ment film | M.A. wavelength of O.A. layer |
|---|---|---|---|---|---|---|---|---|---|---|---|
|  |  |  |  | OXE-03 | NCI-831 | Irg369 |  |  |  |  |  |
| Com. Ex. 4 | O.A. layer 8 | Photoalignment film | 100 |  |  | 6 | 3 | 0.177 | 45 | Exist | 350 nm |
| Com. Ex. 5 | O.A. layer 9 | Photoalignment film | 500 |  |  | 1 | 3 | 0.168 | 48 | Exist | 350 nm |

Ref. Ex.: Reference Example
Com. Ex.: Comparative Example
O.A. layer: Optically anisotropic layer
M.A. wavelength of O.A. layer: Maximum absorption wavelength of optically anisotropic layer Table 2 below shows results of in-plane phase difference values which were of the circularly polarizing plates respectively produced in Examples 1 through 7, Comparative Examples 1 through 5, and Reference Example and were measured before and after the heat resistance test.

Examples 1 through 7, satisfied Formula (Y), and included the respective alignment films were smaller in changed (decreased) amount of the in-plane phase difference value after the heat-resistance test and were excellent in optical characteristic which was wavelength dispersion property.

TABLE 2

|  | Test configuration | A. film Thick-ness | Optically anisotropic layer: Initial front retardation value | | | Optically anisotropic layer: Front retardation value after heat resistance test | | |
|---|---|---|---|---|---|---|---|---|
|  |  |  | R450 | R550 | R650 | R450 | R550 | R650 |
| Com. Ex. 1 | P.P.1/Adhesive/O.A.L.7/Adhesive/Glass | None | 121 nm | 139 nm | 142 nm | 110 nm (−11 nm) | 128 nm (−11 nm) | 131 nm (−11 nm) |
| Com. Ex. 2 | P.P.1/Adhesive/O.A.L.7/Adhesive/Glass | None | 121 nm | 138 nm | 141 nm | 112 nm (−9 nm) | 130 nm (−8 nm) | 133 nm (−8 nm) |
| Com. Ex. 3 | P.P.1/Adhesive/O.A.L.1/Adhesive/Glass | None | 121 nm | 138 nm | 142 nm | 110 nm (−11 nm) | 128 nm (−10 nm) | 131 nm (−11 nm) |
| Com. Ex. 4 | P.P.1/Adhesive/O.A.L.8/Adhesive/Glass | 100 nm | 121 nm | 138 nm | 142 nm | 102 nm (−19 nm) | 117 nm (−21 nm) | 123 nm (−19 nm) |
| Com. Ex. 5 | P.P.1/Adhesive/O.A.L.9/Adhesive/Glass | 100 nm | 121 nm | 138 nm | 142 nm | 103 nm (−18 nm) | 119 nm (−19 nm) | 122 nm (−20 nm) |
| Example 1 | P.P.1/Adhesive/O.A.L.1/P.A.F./Adhesive/Glass | 100 nm | 121 nm | 139 nm | 142 nm | 118 nm (−3 nm) | 136 nm (−3 nm) | 139 nm (−3 nm) |
| Example 2 | P.P.1/Adhesive/O.A.L.1/P.A.F./Adhesive/Glass | 300 nm | 122 nm | 140 nm | 142 nm | 120 nm (−2 nm) | 138 nm (−2 nm) | 140 nm (−2 nm) |
| Example 3 | P.P.1/Adhesive/O.A.L.1/P.A.F./Adhesive/Glass | 100 nm | 121 nm | 139 nm | 142 nm | 120 nm (−1 nm) | 138 nm (−1 nm) | 141 nm (−1 nm) |
| Example 4 | P.P.1/Adhesive/O.A.L.2/P.A.F./Adhesive/Glass | 100 nm | 122 nm | 139 nm | 142 nm | 120 nm (−2 nm) | 136 nm (−3 nm) | 139 nm (−3 nm) |
| Example 5 | P.P.1/Adhesive/O.A.L.3/P.A.F./Adhesive/Glass | 100 nm | 121 nm | 139 nm | 142 nm | 120 nm (−1 nm) | 138 nm (−1 nm) | 140 nm (−2 nm) |
| Example 6 | P.P.1/Adhesive/O.A.L.4/P.A.F./Adhesive/Glass | 100 nm | 121 nm | 139 nm | 142 nm | 120 nm (−1 nm) | 138 nm (−1 nm) | 140 nm (−2 nm) |
| Example 7 | P.P.1/Adhesive/O.A.L.5/P.A.F./Adhesive/Glass | 100 nm | 122 nm | 140 nm | 142 nm | 119 nm (−3 nm) | 136 nm (−4 nm) | 138 nm (−4 nm) |
| Example 8 | P.P.2/Adhesive/O.A.L.1/P.A.F./Adhesive/Glass | 100 nm | 122 nm | 140 nm | 142 nm | 120 nm (−2 nm) | 135 nm (−3 nm) | 138 nm (−4 nm) |
| Ref. Ex. | P.P.1/Adhesive/O.A.L.6/P.A.F./Adhesive/Glass | 100 nm | 126 nm | 139 nm | 141 nm | 126 nm (0 nm) | 138 nm (−1 nm) | 140 nm (−1 nm) |

*Parentheses indicate changed amount
Com. Ex.: Comparative Example
Ref. Ex.: Reference Example
P.P.: Polarizing plate
O.A.L.: Optically anisotropic layer
P.A.F.: Photoalignment film
A. film: Alignment film (Results)

It was found from Tables 1 and 2 that circularly polarizing plates which were respectively obtained in Examples 1 through 7 and included the respective alignment films were smaller in changed (decreased) amount of the in-plane phase difference value of the optically anisotropic layer after the heat-resistance test, as compared with circularly polarizing plates which were respectively obtained in Comparative Examples 1 through 5 and had no alignment film.

From the above results, it was found that the circularly polarizing plates which were respectively obtained in

INDUSTRIAL APPLICABILITY

The laminated body and the circularly polarizing plate of the present invention can inhibit decrease in in-plane phase difference value due to severe use environment (e.g., exposed to high-temperature environment). As such, by utilizing the foregoing excellent characteristic, the laminated body and the circularly polarizing plate of the present invention can be used in various display devices such as a liquid crystal display device.

The invention claimed is:

1. A laminated body comprising an optically anisotropic layer, an alignment film, and an adhesive agent layer which are directly laminated in this order, the optically anisotropic layer being formed by polymerizing a polymerizable liquid crystal compound and having a maximum absorption at a wavelength in a range of not less than 300 nm and not more than 380 nm, the optically anisotropic layer and the alignment film being in contact with each other, the alignment film and the adhesive agent layer being in contact with each other, the alignment film being a photoalignment film which is made of a monomer or a polymer that expresses alignment regulating force by a photodimerization, the optically anisotropic layer being prepared by curing a composition containing a polymerizable liquid crystal compound and at least one photopolymerization initiator, the at least one photopolymerization initiator being an oxime photopolymerization initiator, the optically anisotropic layer satisfying the following Formula (Y):

$$50 < (1 - P'/P0) \times 100 < 85 \quad (Y)$$

wherein: P' represents a P value in a surface of the optically anisotropic layer on which surface the alignment film is laminated and which surface is perpendicular to a thickness direction; P0 represents the P value of the polymerizable liquid crystal compound; and the P value is represented by I(1)/I(2) where I(1) represents a peak intensity derived from in-plane deformation vibration of an ethylenic unsaturated bond and obtained by infrared total reflection absorption spectrum measurement, and I(2) represents a peak intensity derived from stretching vibration of an unsaturated bond of an aromatic ring and obtained by the infrared total reflection absorption spectrum measurement.

2. The laminated body as set forth in claim 1, wherein the optically anisotropic layer satisfies the following Formula (1):

$$100 \text{ nm} < Re(550) < 160 \text{ nm} \quad (1)$$

wherein: Re(550) represents an in-plane phase difference value at a wavelength of 550 nm.

3. The laminated body as set forth in claim 1, wherein the optically anisotropic layer satisfies the following Formula (1'):

$$100 \text{ nm} < Re(550) < 150 \text{ nm} \quad (1')$$

wherein: Re(550) represents an in-plane phase difference value at a wavelength of 550 nm.

4. The laminated body as set forth in claim 1, wherein the optically anisotropic layer satisfies Formula (3) and Formula (4):

$$Re(450)/Re(550) \leq 1.0 \quad (3)$$

$$1.00 \leq Re(650)/Re(550) \quad (4)$$

wherein: Re(450) represents an in-plane phase difference value with respect to light having a wavelength of 450 nm; Re(550) represents an in-plane phase difference value with respect to light having a wavelength of 550 nm; and Re(650) represents an in-plane phase difference value with respect to light having a wavelength of 650 nm.

5. The laminated body as set forth in claim 1, wherein the polymerizable liquid crystal compound has a maximum absorption at a wavelength $\lambda_{max}(LC)$ that satisfies the following Formula (2):

$$300 \text{ nm} \leq \lambda_{max}(LC) \leq 380 \text{ nm} \quad (2).$$

6. The laminated body as set forth in claim 1, wherein:
the at least one photopolymerization initiator has maximum absorptions at a wavelength of less than 350 nm and not less than 350 nm.

7. The laminated body as set forth in claim 1, wherein:
the optically anisotropic layer is a layer formed by curing a composition containing a polymerizable liquid crystal compound and at least two photopolymerization initiators; and
at least one of the at least two photopolymerization initiators has a maximum absorption at a wavelength of less than 350 nm and at least another one of the at least two photopolymerization initiators has a maximum absorption at a wavelength of not less than 350 nm.

8. The laminated body as set forth in claim 1, wherein:
the adhesive agent layer contains a polymer which includes a structural unit derived from an acrylic acid compound or a methacrylic acid compound, and the optically anisotropic layer contains a polymer obtained from a polymerizable liquid crystal compound having an acryloyl group or a methacryloyl group.

9. A circularly polarizing plate comprising a laminated body recited in claim 1.

10. An organic electroluminescent (EL) display device comprising a laminated body recited in claim 1.

11. A touch panel display device comprising a laminated body recited in claim 1.

12. The laminated body according to claim 1,
wherein the composition contains the polymerizable liquid crystal compound in an amount of 70 parts by mass to 99.5 parts by mass relative to 100 parts by mass of a solid content of the composition.

* * * * *